United States Patent [19]

Takasu et al.

[11] 4,423,129
[45] Dec. 27, 1983

[54] ELECTROPHOTOGRAPHIC MEMBER HAVING LAYER CONTAINING METHYLIDENYL HYRAZONE COMPOUND

[75] Inventors: Yoshio Takasu, Tama; Kiyoshi Sakai, Mitaka; Minoru Mabuchi, Tokyo; Shozo Ishikawa, Sayama; Katsunori Watanabe, Yamato, all of Japan

[73] Assignee: Canon Kabushiki Kaisha, Tokyo, Japan

[21] Appl. No.: 325,838

[22] Filed: Nov. 30, 1981

[30] Foreign Application Priority Data

Dec. 17, 1980 [JP] Japan ............................... 55-178532
Mar. 3, 1981 [JP] Japan ............................... 56-30342
Jun. 11, 1981 [JP] Japan ............................... 56-90024

[51] Int. Cl.$^3$ ............................................. G03G 5/14
[52] U.S. Cl. ........................................ 430/59; 430/77; 430/78; 430/84
[58] Field of Search ................. 430/58, 70, 73, 75, 430/79, 82, 59, 77, 78, 84

[56] References Cited

U.S. PATENT DOCUMENTS

| | | |
|---|---|---|
| 3,180,729 | 4/1965 | Klupfel et al. . |
| 3,378,554 | 4/1968 | Pushchel et al. . |
| 3,484,237 | 12/1969 | Shattuck et al. . |
| 3,684,502 | 8/1972 | Gramza et al. . |
| 3,775,105 | 11/1973 | Kukla . |
| 3,775,108 | 11/1973 | Fliari . |
| 3,824,099 | 7/1974 | Champ et al. . |
| 3,837,851 | 9/1974 | Shattuck et al. . |
| 3,870,516 | 3/1975 | Smith et al. . |
| 3,871,882 | 3/1975 | Wiedemann . |
| 3,877,935 | 4/1975 | Regensburger et al. . |
| 3,884,691 | 5/1975 | Rochlitz . |
| 3,894,868 | 7/1975 | Regensburger et al. . |
| 4,024,125 | 5/1977 | Kunstmann et al. . |
| 4,122,113 | 10/1978 | Purner . |
| 4,150,987 | 4/1979 | Anderson et al. . |
| 4,251,614 | 2/1981 | Sasaki et al. . |
| 4,256,821 | 3/1981 | Enomoto et al. . |
| 4,260,672 | 4/1981 | Sasaki . |
| 4,265,991 | 5/1981 | Hirai et al. . |
| 4,272,598 | 6/1981 | Sasaki et al. . |
| 4,278,747 | 7/1981 | Murayama et al. . |
| 4,279,981 | 7/1981 | Ohta et al. . |
| 4,297,426 | 10/1981 | Sakai et al. . |

FOREIGN PATENT DOCUMENTS

| | | |
|---|---|---|
| 13172 | 7/1980 | European Pat. Off. . |
| 2844394 | of 0000 | Fed. Rep. of Germany . |
| 2302522 | 8/1974 | Fed. Rep. of Germany . |
| 157551 | of 0000 | Japan . |
| 520641 | of 0000 | Japan . |
| 43-1619768 | 7/1968 | Japan . |
| 7123673 | 9/1973 | Japan . |
| 51-94829 | 8/1976 | Japan . |
| 54-112637 | 9/1979 | Japan . |
| 54-119925 | 9/1979 | Japan . |
| 54-121742 | 9/1979 | Japan . |
| 55-17105 | 2/1980 | Japan . |
| 55-108667 | 8/1980 | Japan . |
| 1490197 | of 0000 | United Kingdom . |
| 930988 | 7/1963 | United Kingdom . |
| 1030024 | 5/1966 | United Kingdom . |
| 1296390 | 11/1972 | United Kingdom . |
| 1370197 | 10/1976 | United Kingdom . |
| 1453024 | 10/1976 | United Kingdom . |
| 1465141 | 2/1977 | United Kingdom . |
| 1465142 | 2/1977 | United Kingdom . |
| 2001769A | 2/1979 | United Kingdom . |
| 2018446A | 10/1979 | United Kingdom . |
| 2034493A | 6/1980 | United Kingdom . |
| 2052082A | 1/1981 | United Kingdom . |
| 2055803A | 3/1981 | United Kingdom . |
| 2034494A | 6/1982 | United Kingdom . |

*Primary Examiner*—John E. Kittle
*Assistant Examiner*—John L. Goodrow
*Attorney, Agent, or Firm*—Fitzpatrick, Cella, Harper & Scinto

[57] ABSTRACT

An electrophotographic photosensitive member is characterized by having a layer which contains at least one hydrazone compound represented by the following formula (1) or (2):

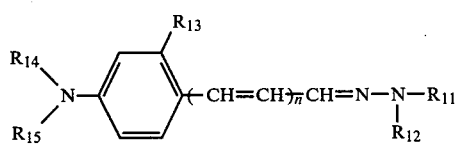

Formula (1)

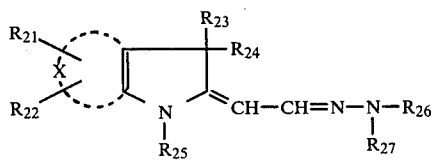

Formula (2)

wherein $R_{11}$ represents substituted or unsubstituted naphthyl; $R_{12}$ represents substituted or unsubstituted alkyl, substituted or unsubstituted aralkyl, or substituted or unsubstituted aryl; $R_{13}$ represents hydrogen, alkyl, or alkoxy; $R_{14}$ and $R_{15}$ each represent substituted or unsubstituted alkyl, substituted or unsubstituted aralkyl, or substituted or unsubstituted aryl; n is 0 or 1; when n=1, $R_{14}$ and $R_{15}$, together with the nitrogen which links them, may complete a cyclic amino group; X represents a group necessary for completing a benzene ring or naphthalene ring; $R_{21}$ and $R_{22}$ each represent hydrogen, halogen, alkyl, alkoxy or disalkylamino; and $R_{23}$, $R_{24}$, $R_{25}$, $R_{26}$ and $R_{27}$ each represent substituted or unsubstituted alkyl, substituted or unsubstituted aralkyl, or substituted or unsubstituted aryl.

39 Claims, 1 Drawing Figure

ELECTROPHOTOGRAPHIC MEMBER HAVING LAYER CONTAINING METHYLIDENYL HYRAZONE COMPOUND

BACKGROUND OF THE INVENTION

1. Field of the Invention

This invention relates to electrophotographic photosensitive members and more particularly to an electrophotographic photosensitive member having a charge transport layer or photosensitive layer which contains a specific hydrazone compound.

2. Description of the Prior Art

There have so far been known inorganic photoconductive materials such as selenium, cadmium sulfide, and zinc oxide. In contrast to their many advantages, for instance, chargeability to a suitable potential in a dark place, less dissipation of charge in a dark place, and fast dissipation of charge possible by light irradiation, these photoconductive materials have also some disadvantages. For instance, selenium group photosensitive members have the disdvantages of a difficulty in setting manufacturing conditions and of a consequent high manufacturing cost, and in addition are deficient in flexibility, heat stability, and physical strength. Zinc oxide group and cadmium sulfide group photosensitive members are unsatisfactory in physical and mechanical properties such as surface smoothness, strength, and wear resistance, because these photosensitive materials are used in the form of dispersion in a binder resin. Zinc oxide group photosensitive member, requiring sensitization with coloring matter, of which a typical one is Rose Bengal, are also disadvantageous in that they cannot provide stable images over a long period of survice because said coloring matter causes charge deterioration due to corona charging or light fading due to exposure.

On the other hand, various organic photoconductive polymers including polyvinylcarbazole have been proposed. However, they have been prevented from practical use until now in spite of their superiority to inorganic photoconductive materials, mentioned above, in film-forming capability and lightness. This is because the organic photoconductive polymers hitherto proposed do not have sufficient sensitivity and are inferior to the inorganic photoconductive materials in durability or stability to environmental variations.

Further, there are known photosensitive members employing a low-molecular organic photoconductive substance such as p-diethylaminobenzaldehyde-N,N-diphenylhydrazone or p-diethylaminobenzaldehyde-N-phenyl-N-benzylhydrazone, disclosed in U.S. Pat. No. 4,150,987 (Jpn. Pat. Appl. Laid-open No. 59143/1979), N,N-diphenylhydrazino-3-methylidene-9-ethylcarbazole disclosed in Ger. Pat. Offen. No. 291971 (Jpn. Pat. Appl. Laid-open No. 150128/1979), p-diethylaminobenzaldehyde-N-phenyl-N-methylhydrazone disclosed in Jpn. Pat. Appl. Laid-open No. 52064/1980. Low-molecular organic photoconductive substances have the advantage of being capable of forming a good film of photosensitive layer in combination with an appropriate binder resin. In practice, however, the electrophotographic photosensitive members employing these hydrazone compounds are still unsatisfactory in sensitivity or in the stability of light portion potential when charging and exposing are repeated, thus requiring further improvements.

SUMMARY OF THE INVENTION

Figure 1:
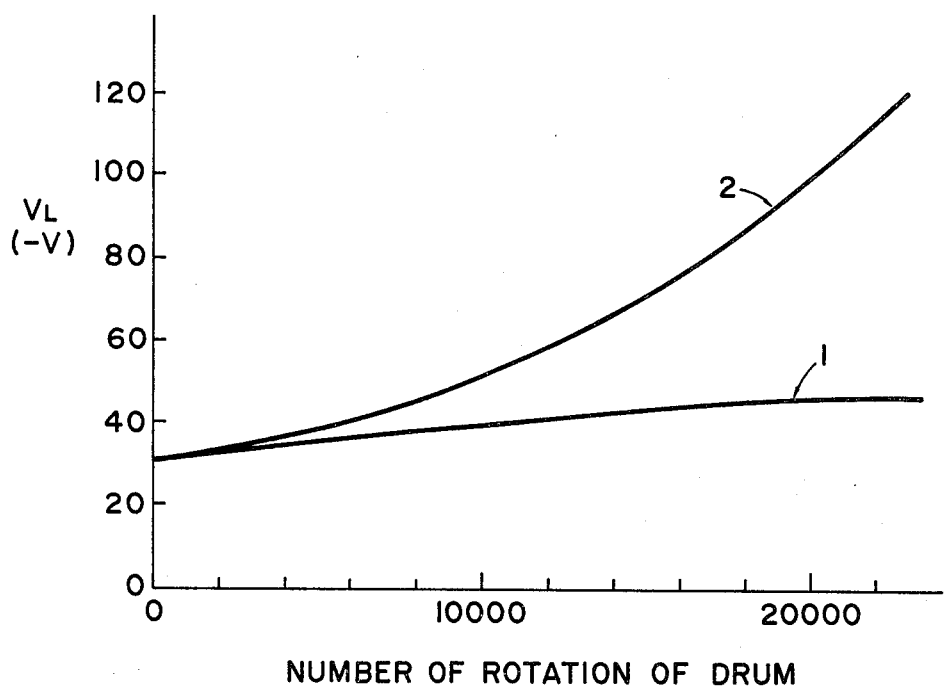
FIG. 1 is a graph illustrating the variation of light portion potential VL with number of drum revolution (in FIG. 1 referred to as "number of rotation drum") on the photosensitive members of Example 20 and Comparative Example 4, mentioned later.

An object of this invention is to provide an electrophotographic photosensitive member having a novel hydrazone compound, another object is to provide an electrophotographic photosensitive member of high sensitivity, and still another object is to provide an electrophotographic photosensitive member of sufficient durability as well as of high sensitivity.

According to the present invention, there is provided on electrophotographic photosensitive member characterized by having a layer which contains at least one hydrazone compound represented by the following formula (1) or (2):

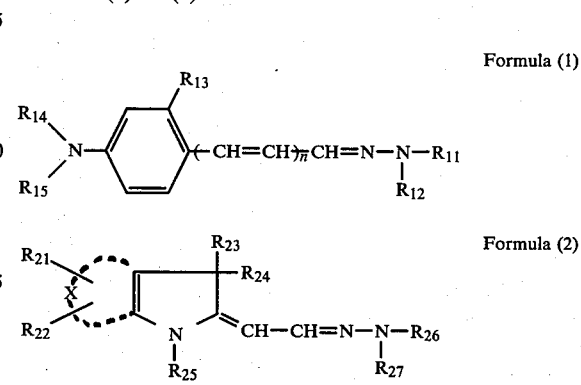

wherein $R_{11}$ represents substituted or unsubstituted naphthyl; $R_{12}$ represents substituted or unsubstituted alkyl, substituted or unsubstituted aralkyl, or substituted or unsubstituted aryl; $R_{13}$ represents hydrogen, alkyl, or alkoxy; $R_{14}$ and $R_{15}$ each represent substituted or unsubstituted alkyl, substituted or unsubstituted aralkyl, or substituted or unsubstituted aryl; n is 0 or 1; when $n=1$, $R_{14}$ and $R_{15}$, together with the nitrogen which links them, may complete a cyclic amino group; X represents a group necssary for completing a benzene ring or naphthalene ring; $R_{21}$ and $R_{22}$ each represent hydrogen, halogen, alkyl, alkoxy, or dialkylamino; and $R_{23}$, $R_{24}$, $R_{25}$, $R_{26}$, and $R_{27}$ each represent substituted or unsubstituted alkyl, substituted or unsubstituted aralkyl, or substituted or unsubstituted aryl.

DETAILED DESCRIPTION OF THE PREFERRED EMBODIMENTS

It has been found that electrophotographic photosensitive members by employing a specific hydrazone compound represented by the following formula (1) or (2) in their charge transport layer or photosensitive layer, acquire markedly improved characteristics as compared with electrophotographic photosensitive members employing hydrazone compounds hitherto known:

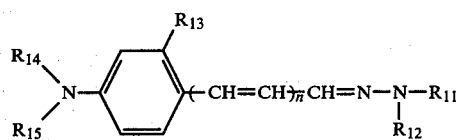
Formula (1)

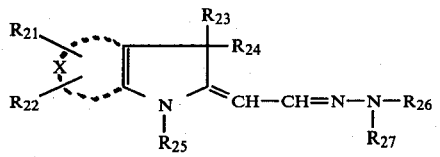
Formula (2)

In these formulas, $R_{11}$ represents naphthyl (e.g., α-naphthyl or β-naphtyl); $R_{12}$ represents alkyl (e.g., methyl, ethyl, n-propyl, iso-propyl, n-butyl, iso-butyl, sec-butyl, t-butyl, n-hexyl, etc.), aralkyl (e.g., benzyl, phenethyl, naphthylmethyl, etc.), or aryl (e.g., phenyl, α-naphthyl, β-naphthyl, etc.); the naphthyl of $R_{11}$ and the alkyl, aralkyl, and aryl of $R_{12}$ may be substituted by alkoxy (e.g., methoxy, ethoxy, propoxy, butoxy, etc.), halogen (e.g., chlorine, bromine, iodine, etc.), or dialkylamino (e.g., dimethylamino, diethylamino, dipropylamino, dibutylamino, etc.); said naphtyl, aralkyl, and aryl may also be substituted by alkyl (e.g., methyl, ethyl, n-propyl, isopropyl, n-butyl, isobutyl, t-butyl, n-amyl, sec-amyl, n-hexyl, etc.); $R_{13}$ represents hydrogen, alkyl (e.g., methyl, ethyl, n-propyl, isopropyl, n-butyl, isobutyl, sec-butyl, t-butyl, n-hexyl, etc.) or alkoxy (e.g., methoxy, ethoxy, propoxy, butoxy, etc.); $R_{14}$, $R_{15}$, $R_{23}$, $R_{24}$, $R_{25}$, $R_{26}$, and $R_{27}$ each represent alkyl (e.g., methyl, ethyl, n-propyl, isopropyl, n-butyl, isobutyl, sec-butyl, t-butyl, n-hexyl, etc.), aralkyl (e.g., benzyl, phenethyl, naphthylmethyl, etc.), or aryl (e.g., phenyl, naphthyl, etc.); these alkyl, aralkyl, and aryl may also be substituted by alkoxy (e.g., methoxy, ethoxy, propoxy, butoxy, etc.), halogen (e.g. chlorine, bromine, iodine, etc.), or dialkylamino (e.g., dimethylamino, diethylamino, dipropylamino, dibutylamino, etc.), and said aralkyl and aryl may also be substituted by alkyl (e.g., methyl, ethyl, propyl, butyl, amyl, hexyl, etc.); n is 0 or 1; when n is 1, $R_{14}$ and $R_{15}$, together with the nitrogen atom which links them, may complete a cyclic amino group (e.g., pyrrolidino, piperidino, morpholino, etc.); X represents a group necessary for completing a benzene ring or naphthalene ring; $R_{21}$ and $R_{22}$ each represent hydrogen, halogen (e.g., chlorine, bromine, iodine, etc.), alkyl (e.g., methyl, ethyl, n-propyl, isopropyl, n-butyl, isobutyl, sec-butyl, t-butyl, n-amyl, t-amyl, n-hexyl, etc.), alkoxy (e.g., methoxy, ethoxy, propoxy, butoxy, etc.), or dialkylamino (e.g., dimethylamino, diethylamino, dipropylamino, dibutylamino, etc.); and $R_{21}$ and $R_{22}$ may be the same or different.

Individual examples of the hydrazone compounds represented by formula (1) are cited below:

No. 1.
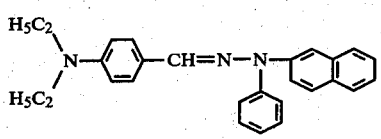

2.
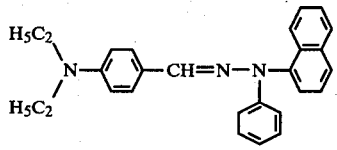

3.
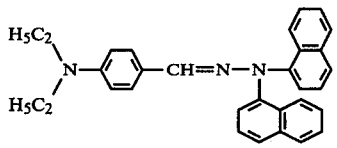

4.
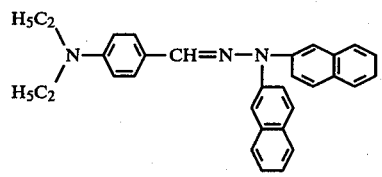

5.
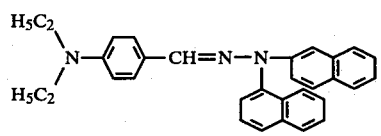

6.
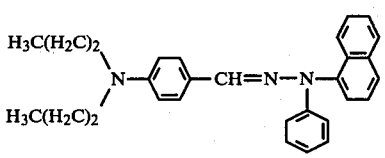

7.
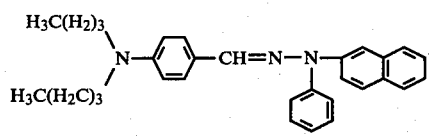

8.
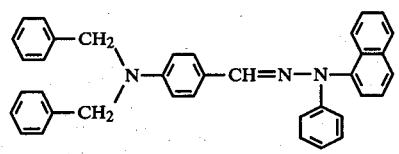

9.
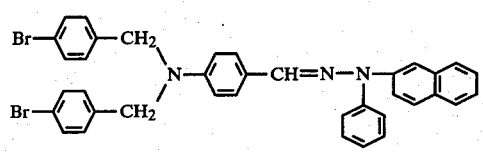

10.
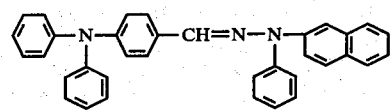

11.
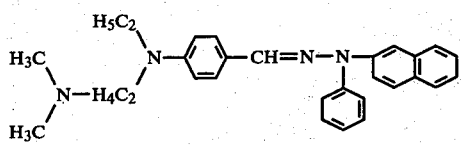

-continued
12. 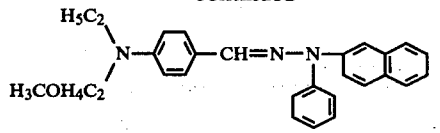
13. 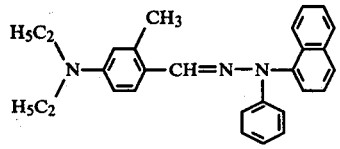
14. 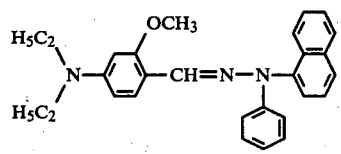
15. 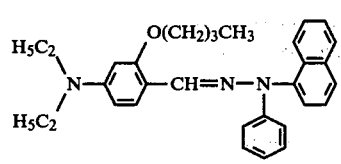
16. 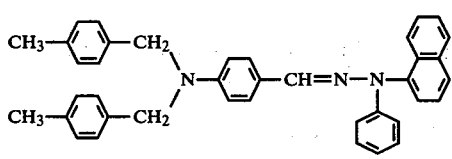
17. 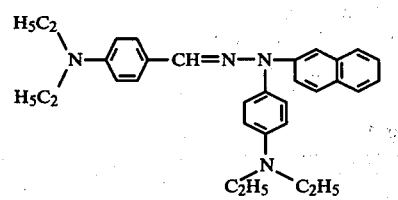
18. 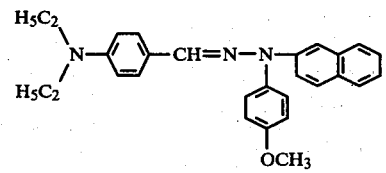
19. 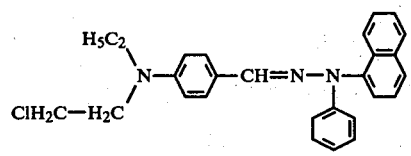
20. 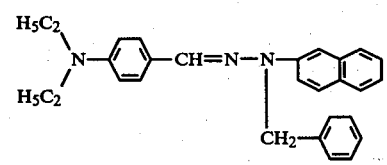
21. 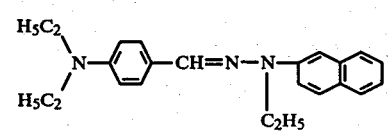
-continued
22. 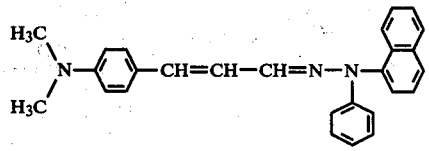
23. 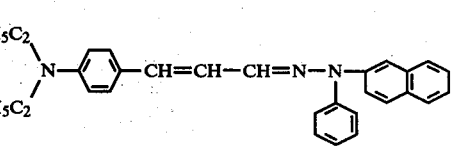
24. 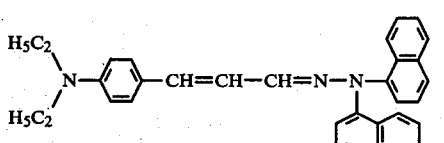
25. 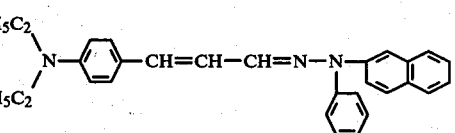
26. 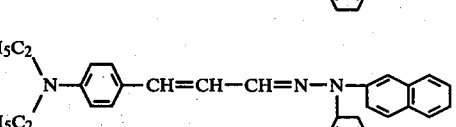
27. 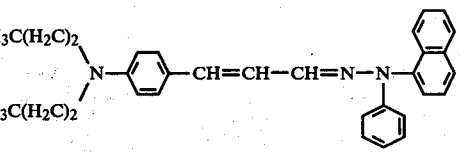
28. 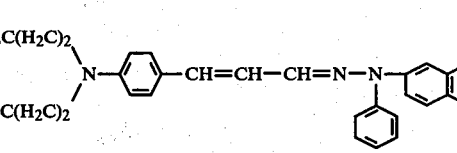
29. 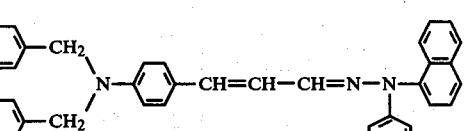
30. 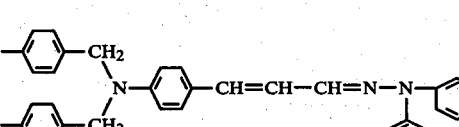
31. 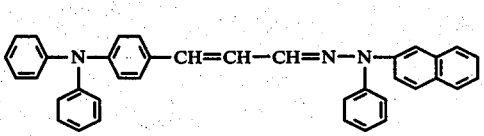

-continued

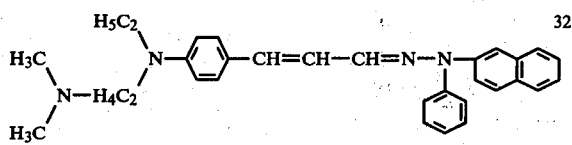
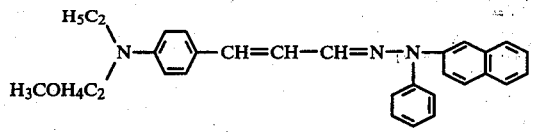
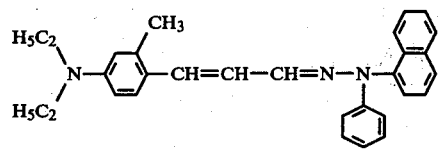
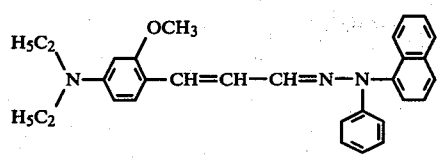
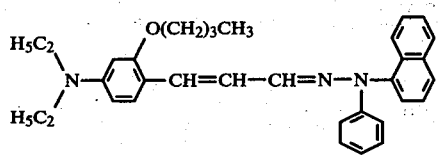
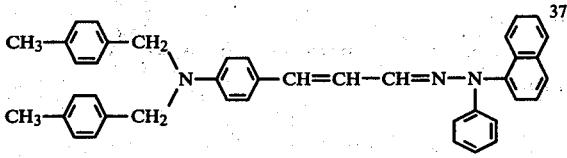
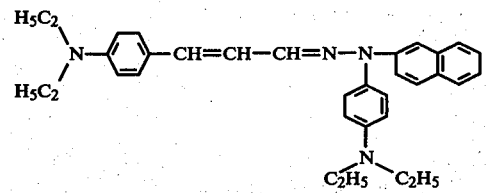
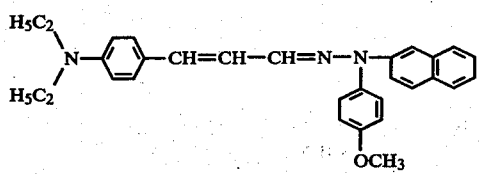
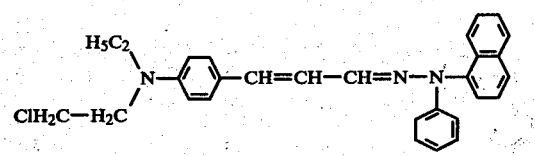

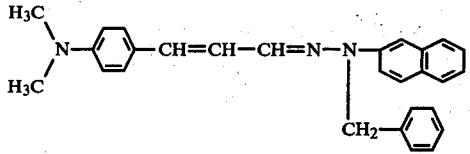
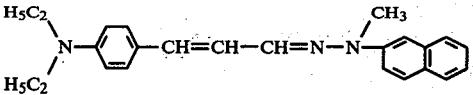
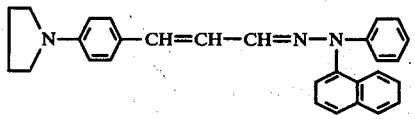

These compounds can be used alone or in combination with others.

The compounds represented by formula (1) can be synthesized by reaction of hydrazines represented by the formula $$H_2N-N-R_{11} \atop R_{12} \qquad (a)$$

($R_{11}$ and $R_{12}$ are as defined above) with an aldehyde represented by the formula

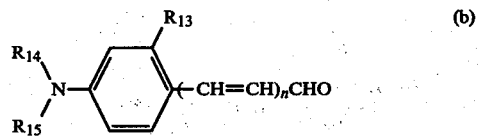

(n, $R_{13}$, $R_{14}$, and $R_{15}$ are as defined above).

Examples of the synthetic process are given below.

SYNTHESIS EXAMPLE 1

(Synthesis of hydrazone compound No. 1, cited above)

(In a 200-ml three-necked flask were placed 40 ml of ethanol, 40 ml of acetic acid, 2.83 g (0.012 mol) of a hydrazine (represented by formula (a), where $R_{11}$ is β-naphthyl and $R_{12}$ phenyl), and 2.14 g (0.012 mol) of p-diethylaminobenzaldehyde, and the reaction was carried out at room temperature for one hour. The reaction mixture was poured into water, and the separated solid matter was filtered off, washed with water repeatedly, dried, and then recrystallized from a methyl ethyl ketone-ethanol mixture, giving 1.27 g of yellow crystals of m.p. 120.5°–121.5° C. (yield 27%).

Elementary analysis:

| | Calcd. for $C_{27}H_{27}N_3$ | Found |
|---|---|---|
| C | 82.39% | 82.36% |
| H | 6.93% | 6.94% |
| N | 10.68% | 10.70% |

SYNTHESIS EXAMPLE 2

(Synthesis of hydrazone compound No. 22 cited above)

In a 300-ml three-necked flask were placed 67 ml of ethanol, 67 ml of acetic acid, 10.38 g (0.044 mol) of a hydrazine (represented by formula (a) wherein $R_{11}$ is α-naphthyl and $R_{12}$ phenyl), and 7.77 g (0.044 mol) of p-dimethylaminocinnamaldehyde, and the reaction was carried out at room temperature for one hour. The reaction mixture was poured into water and the separated solid matter was filtered off, washed with water repeatedly, dried, and then recrystallized from methyl cellosolve, giving 8.59 g of yellow crystals of m.p. 198°–200° C. (yield 50%).

Elementary analysis:

|   | Calcd. for $C_{27}H_{25}N_3$ | Found |
|---|---|---|
| C | 82.82% | 82.88% |
| H | 6.45% | 6.40% |
| N | 10.73% | 10.72% |

Other hydrazone compounds of formula (1), used in this invention, can be synthesized in similar ways.

Typical examples of the hydrazone compound represented by formula (2) are cited as follows:

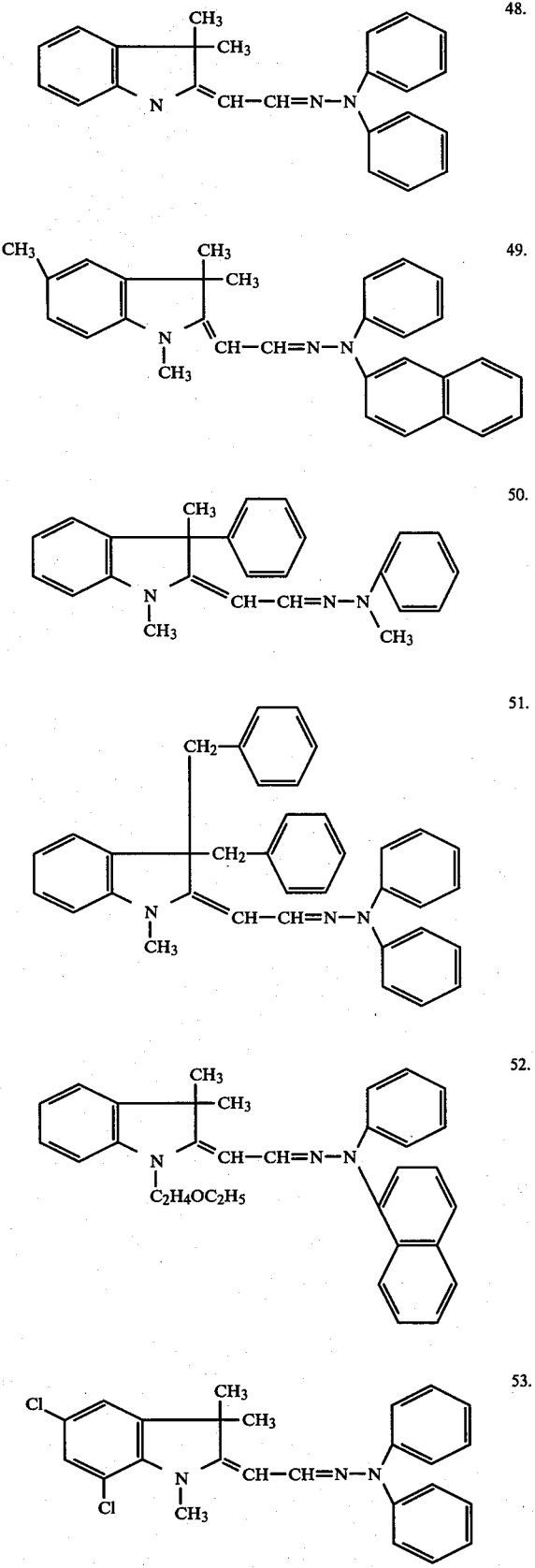

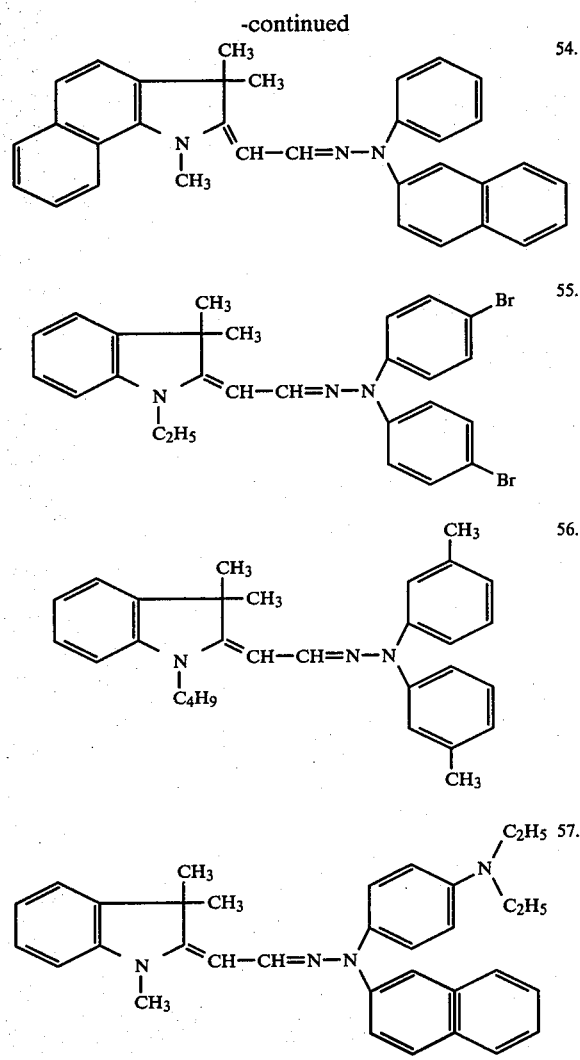

These compounds can be used alone or in combination with others.

These hydrazone compounds of formula (2) can be synthesized by reaction of hydrazine compounds represented by the formula

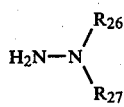

(c)

($R_{26}$ and $R_{27}$ are as defined above), with an aldehyde represented by the formula

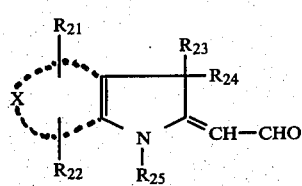

(d)

(X, $R_{21}$, $R_{22}$, $R_{23}$, $R_{24}$, and $R_{25}$ are as defined above).

An example of the synthetic process is given below.

SYNTHESIS EXAMPLE 3

(Synthesis of hydrazone compound No. 45 cited above)

This hydrazone compound can be synthesized according to the following reaction:

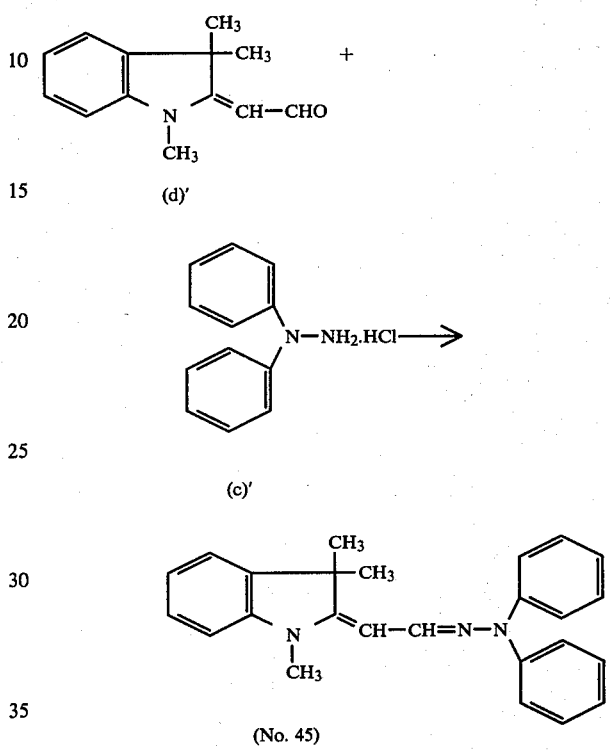

After 6.00 g ($2.72 \times 10^{-2}$ mol) of 1,1-diphenylhydrazine hydrochloride (compound (c)' in the above equation) has been dissolved in 60 ml of ethanol in a 300 ml three-necked flask, 40 ml of acetic acid and successively a solution of 5.48 g ($2.72 \times 10^{-2}$ mol) of aldehyde (d)' (shown in the above equation) in 20 ml of ethanol were added thereto to react at 50° C. for 1.5 hours. The reaction mixture was poured into a large amount of water and neutralized, and the separated yellowish brown solid was filtered off, washed with water repeatedly, dried, and then recrylstallized from ethanol, giving 6.5 g of yellow crystals of m.p. 138.0°–139.0° (yeild 65%).

Elementary analysis:

|   | Calcd. for $C_{23}H_{25}N_3$ | Found |
|---|---|---|
| C | 81.71% | 81.46% |
| H | 6.86% | 6.94% |
| N | 11.43% | 11.21% |

Other hydrazone compounds of formula (2), used in this invention, can be synthesized in similar ways.

The hydrazone compounds of formula (1) or (2), while applicable to any known type of electrophotographic photosensitive member containing organic photoconductive materials, are preferably used in those comprising:

(1) a charge-transfer complex formed by combining an electron donating material and an electron accepting material;

(2) an organic photoconductive material sensitized by adding a dye;
(3) a hole matrix containing a dispersed pigment;
(4) a charge generation layer and a charge transport layer having separate functions;
(5) an organic photoconductor and a co-crystalline complex of a dye and a resin; and
(6) a charge-transfer complex to which an organic or inorganic charge-generating material has been added.

Of these types, (3)–(6) are preferable. In particular, when the hydrazone compounds represented by formula (1) or (2) are used in photosensitive members of type (4), i.e., in those comprising a charge generation layer and a charge transport layer having respective allotted functions, these photosensitive members have an improved sensitivity and a lowered residual potential. In addition, it is possible, in this case, to suppress the reduction of sensitivity and the rise of residual potential, caused during repeated operations thereof, to a practically negligible level. Thus, more detailed description will be made below on the type (4) of photosensitive members.

In this type of photosensitive members, a layer construction comprising a conductive layer, charge generation layer, and charge transport layer is essential. Although the charge generation layer may be laid either over or beneath the charge transport layer, the lamination in order of conductive layer, charge generation layer, and charge transport layer is favourable in the aspect primarily of mechanical strength or in certain cases, of chargeability. A bond layer can be laid between the conductive and charge generation layers for the purpose of improving the adhesion between them.

Various kinds of existing binders such as casein, poly(vinyl alcohol), hydroxypropylcellulose, and the like can be used as a material of the bond layer.

The suitable thickness of the bond layer is 0.1–5μ, preferably 0.5–3μ.

Any substance can be used as a charge-generating material for the charge generation layer, as far as the substance has a function to generate charge carriers in an excellent efficiency. The preferred materials include inorganic substances such as selenium, selenium-tellurium, selenium-arsenic, cadmium sulfide, amorphous silicon, and the like and organic substances such as pyrylium dyes, thiopyrylium dyes, triarylmethane dyes, thiazine dyes, cyanine dyes, phthalocyanine pigments, perylene pigments, indigo pigments, thioindigo pigments, quinacridone pigments, methine dyes derived from squaric acid, azo pigments, and polycyclic quinone pigments. The suitable thickness of the charge generation layer is up to 5μ, preferably 0.05–3μ.

The charge generation layer can be formed by a method such as vacuum deposition, sputtering, glow discharge, or usual coating to meet the charge-generating material used.

In the case of coating, charge-generating materials can be applied in a form binder-free, dispersed in a binder solution, or homogeneously dissolved in a binder solution.

When the charge generation layer is formed by coating a dispersion or solution of a charge-generating material in a binder solution, the binder content in the charge generation layer is desirably 80% or less, preferably 40% or less, because too large amounts of binder adversely affect the sensitivity. Various kinds of resins such as poly(vinyl butyral), polyesters, etc., conventionally used are applicable as the binder for the charge generation layer.

A charge transport layer is laid over the charge generation layer formed in some way mentioned above. Thickness of the charge transport layer is 5–30μ, preferably 8–20μ.

Preferred examples of charge-transporting materials usable in the electrophotographic photosensitive member of this invention are given below.

(1) Amorphous silicon
(2) Selenium-tellurium
(3) Selenium-arsenic
(4) Cadmium sulfide

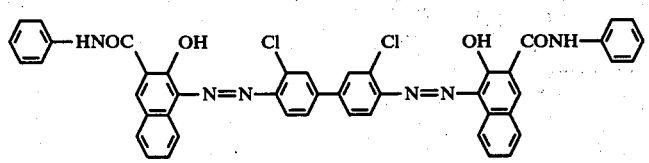

(5)

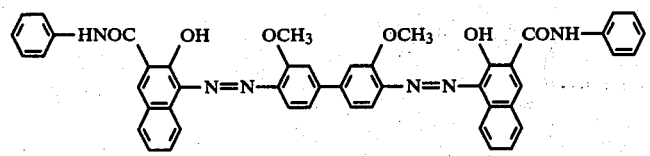

(6)

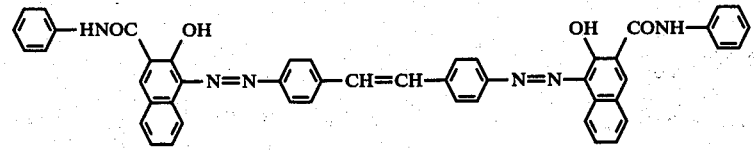

(7)

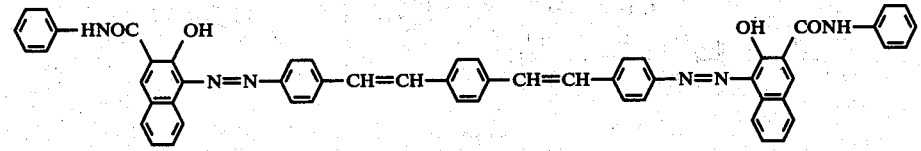

(8)

-continued
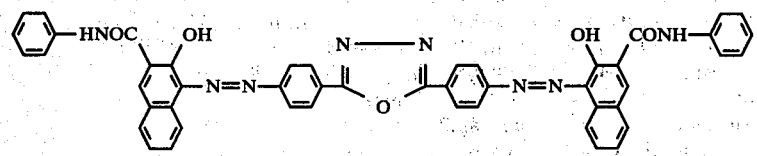 (9)
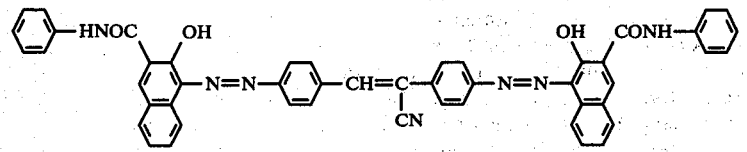 (10)
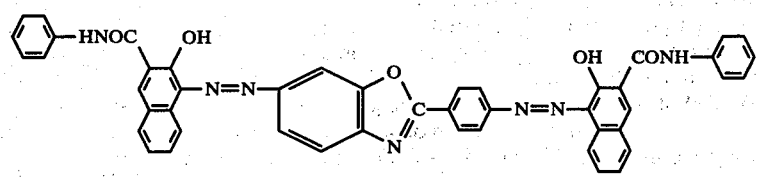 (11)
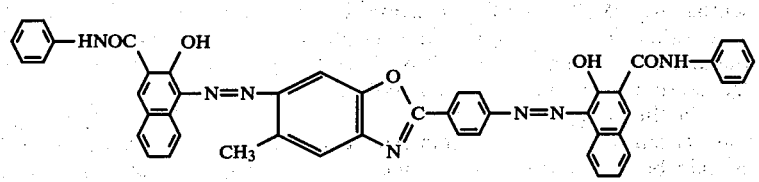 (12)
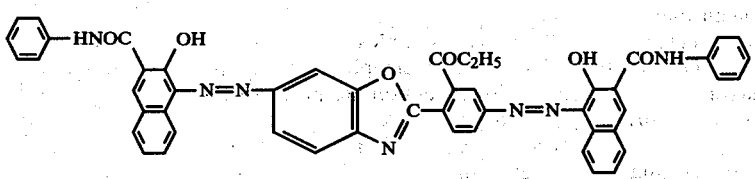 (13)
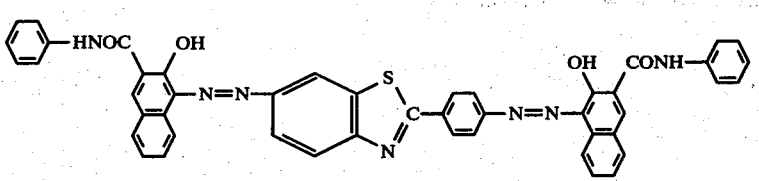 (14)
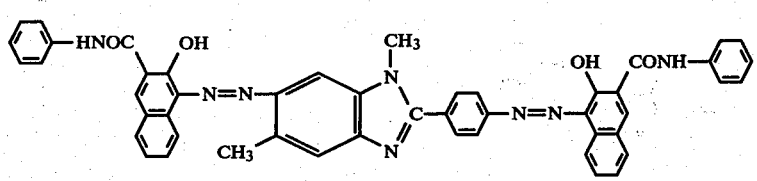 (15)
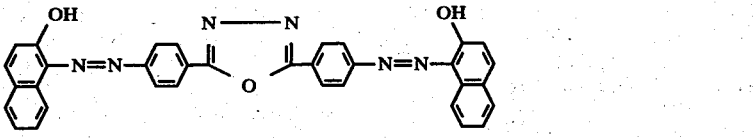 (16)
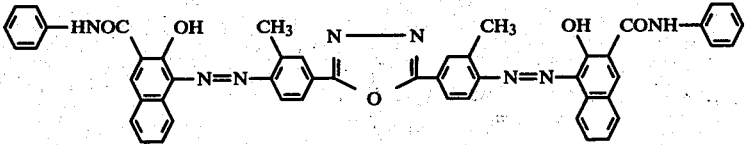 (17)

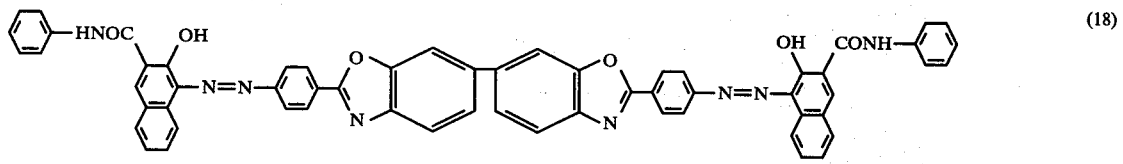
(18)
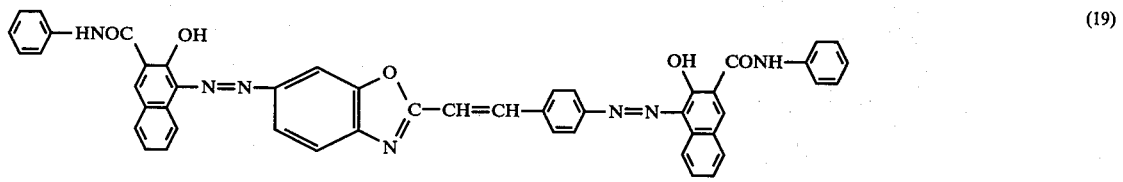
(19)
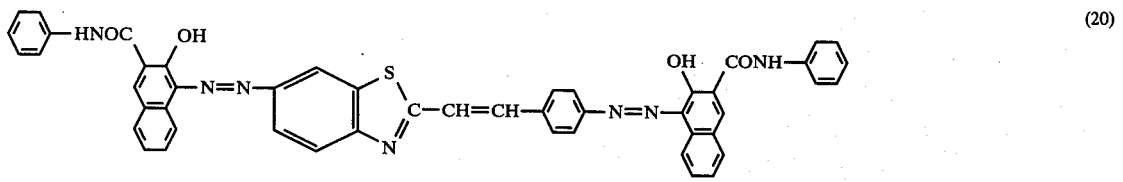
(20)
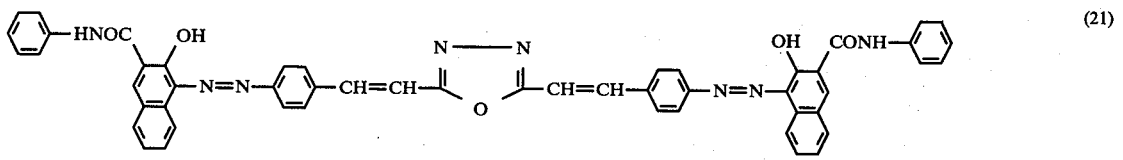
(21)
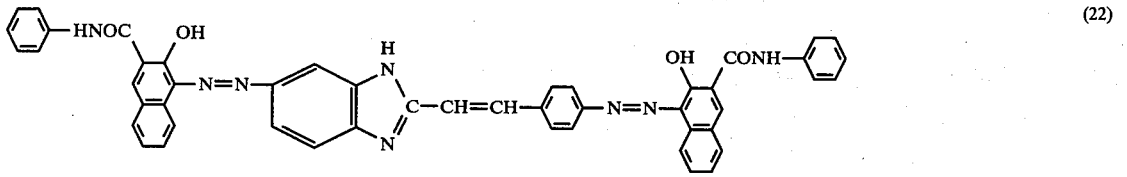
(22)
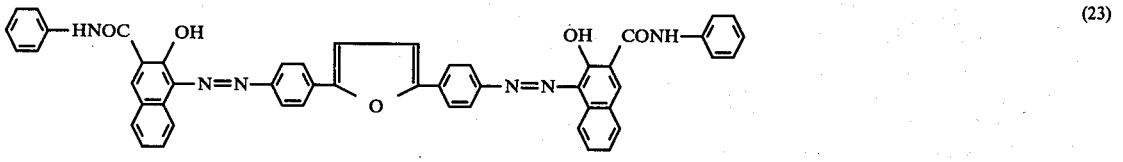
(23)
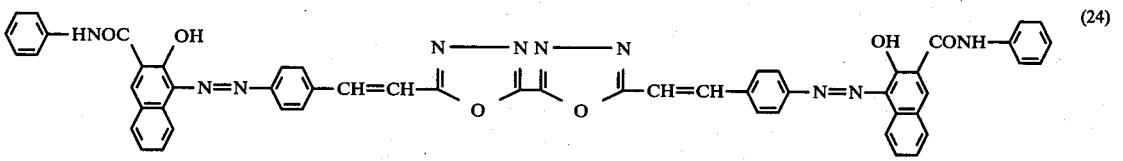
(24)
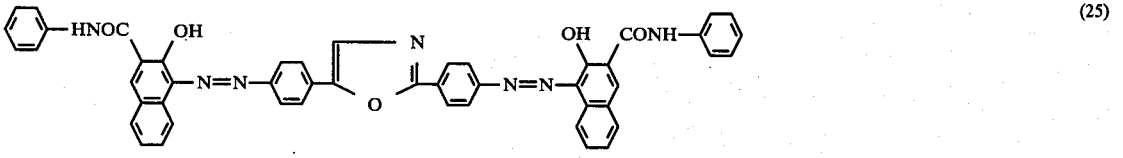
(25)
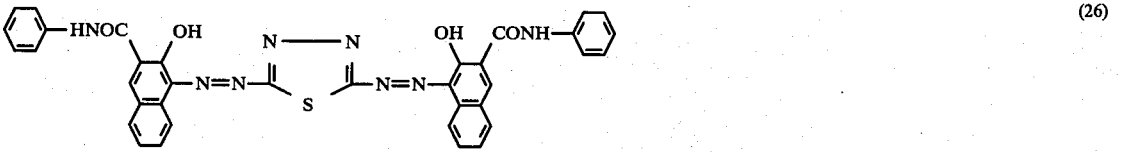
(26)

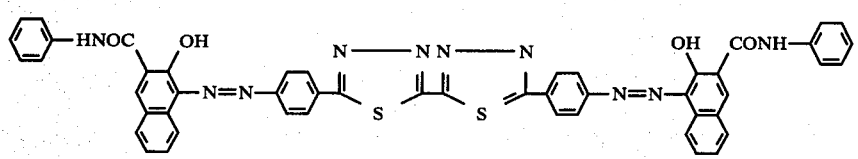 (27)
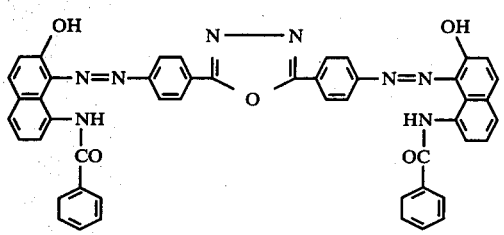 (28)
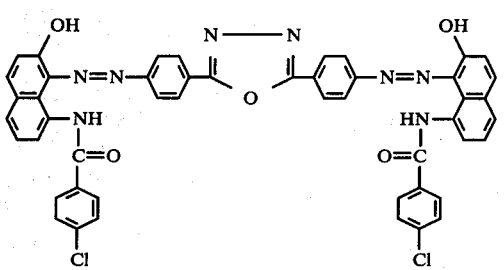 (29)
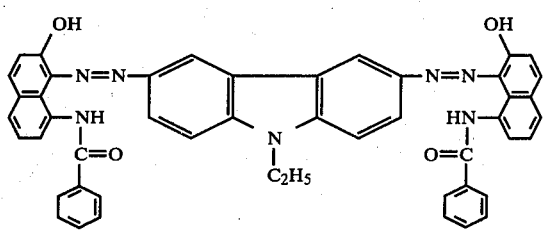 (32)
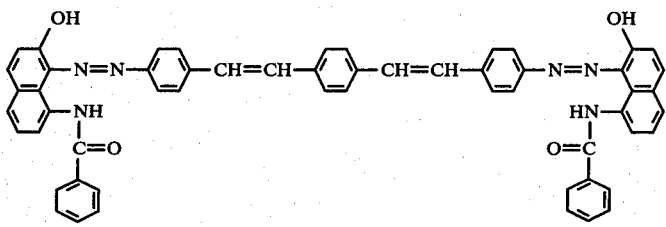 (33)
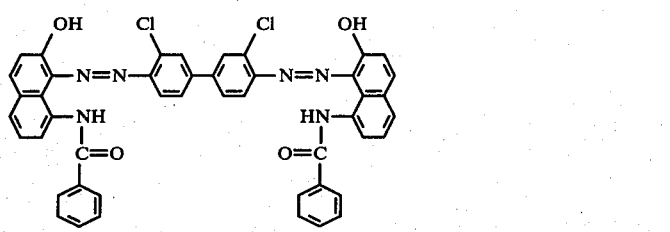 (34)
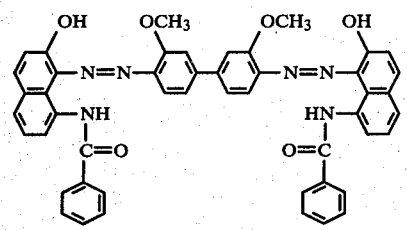 (35)

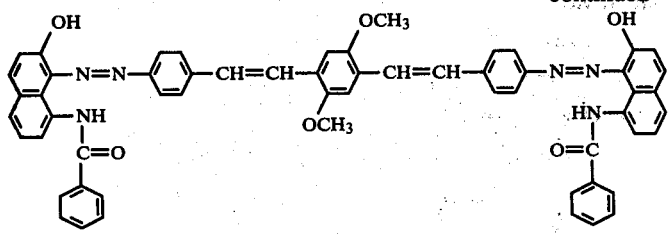
(36)
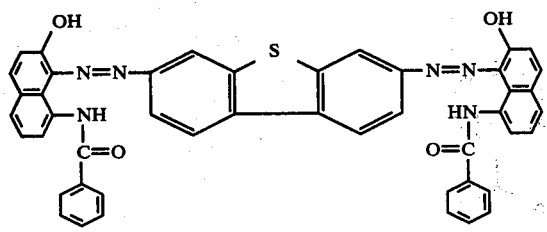
(37)
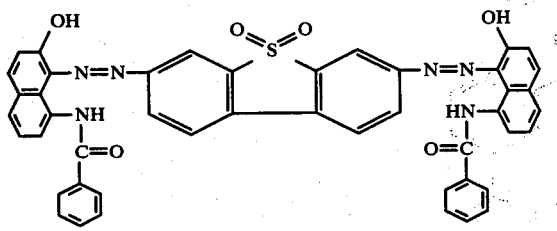
(38)
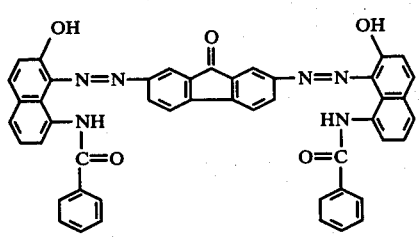
(39)
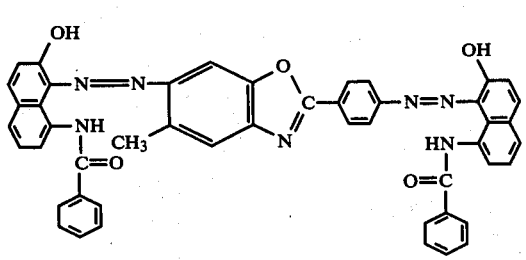
(40)
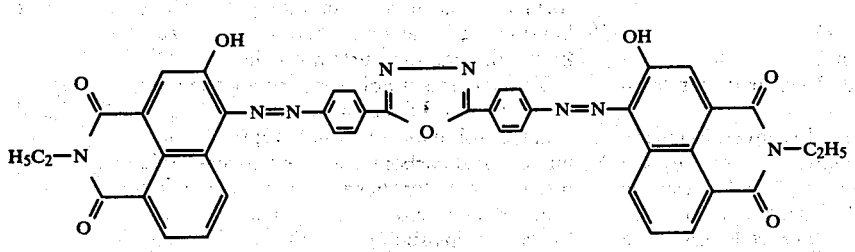
(41)
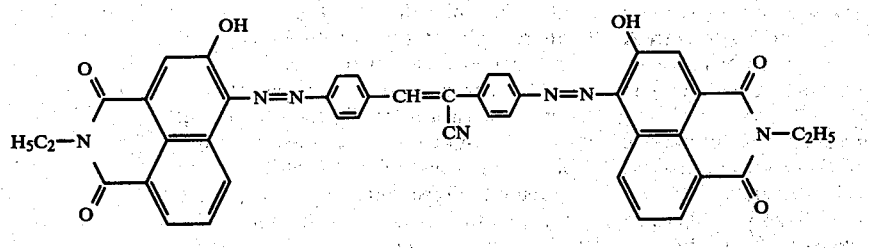
(42)

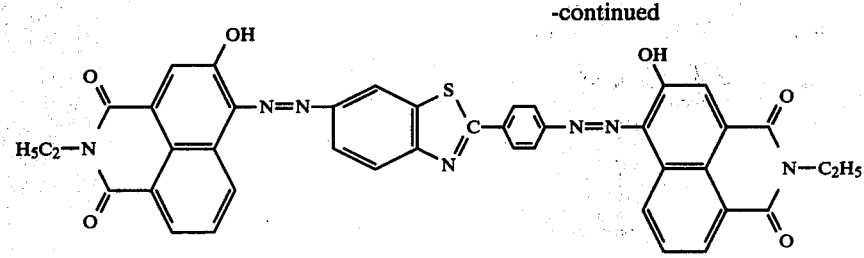 (44)

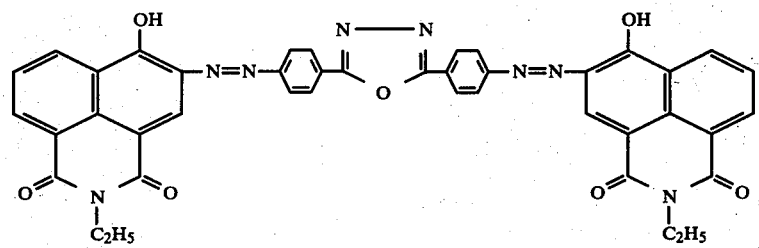 (45)

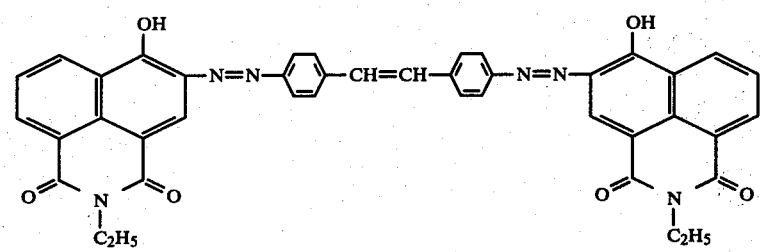 (46)

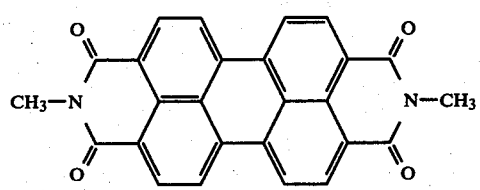 (49)

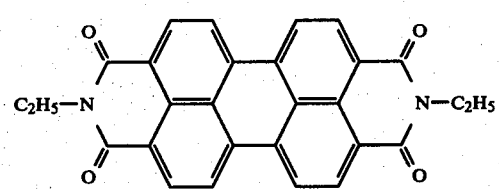 (50)

(51) Methine dyes derived from squaric acid
(52) Indigo dye C.I. No. 78000
(53) Thioindigo dye C.I. No. 78800
(54) β-Form copper phthalocyanine These compounds can be used alone or in combination with others.

Hydrazone compounds used in this invention have themselves no film forming capability, so that they are dissolved together with various kinds of binder resins in suitable solvents, and these solutions are coated in usual ways and dried to form charge transport layers. Said binder resins include various resins conventionally used, such as acrylic resins, polyesters, polycarbonates, etc. A photoconductive polymer such as poly(N-vinylcarbazole) having itself a charge-transporting function can also be used as this binder.

The mixing ratio of said binder to the hydrazone compound is preferably 100:10–500 by weight. Thickness of the charge transport layer is preferably 2–100μ, more preferably 5–30μ, and most preferably 8–20μ. The coating to form the charge transport layer can be performed in usual ways including blade coating, Meyer bar coating, spray coating, dip coating, bead coating, air knife coating, and curtain coating.

The solvents usable for forming the charge transport layer of this invention include many generally useful organic solvents, of which typical examples are aromatic hydrocarbons such as benzene, toluene, xylene, mesitylene, chlorobenzene and the like; ketones such as acetone, 2-butanone, and the like; halogenated aliphatic hydrocarbons such as methylene chloride, chloroform, ethylene chloride, and the like; and cyclic or linear ethers such as tetrahydrofuran, ethyl ether, and the like; and further mixtures of these solvents.

The charge transport layer of this invention may contain a variety of additives including diphenyl, chlorinated diphenyl, o-terphenyl, p-terphenyl, dibutyl phthalate, dimethylglycol phthalate, dioctyl phthalate, triphenyl phosphate, methylnaphthalene, benzophenone, chlorinated paraffin, dilauryl thiodipropionate, 3,5-dinitrosalicylic acid, fluorocarbons, silicone oils, silicone rubbers, and phenolic compounds such as 2,6-di-t-butyl-p-cresol, 2,2'-methylene-bis(4-methyl-6-t-butylphenol), α-tocopherol, 2-t-octyl-5-chlorohydroquinone, 2,5-di-t-octylhydroquinone, and the like.

Any supporting material may be used in the electrophotographic photosensitive members of this invention, provided that it is given conductivity. It may be any type of conductive material used conventionally. As examples of the support may be cited sheets of metals such as aluminum, vanadium, molybdenum, chromium, cadmium, titanium, nickel, copper, zinc, palladium, indium, tin, platinum, gold, stainless steel, brass, and the like; vacuum metallized or metal laminated plastic sheets; and the like. The shape of the support may be like a sheet, a cylinder, or some other forms.

The hydrazone compounds used in this invention are of a hole-transporting character. Accordingly, when the photosensitive member of this invention which has a laminate construction in order of conductive layer, charge generation layer, and charge transport layer is operated, the surface of the charge transport layer is required to be negatively charged. Upon charge exposure of the negatively charged surface, holes produced in the charge generation layer, in the exposed areas, are injected into the charge transport layer, then arrive at the surface, and neutralize negative charges to decay the surface potential, thus resulting in an electrostatic contrast between the exposed and nonexposed areas.

To visualize this electrostatic contrast, various conventional development processes can be used.

The hydrazone compounds of this invention can also be applied to other types of electrophotographic photosensitive members, besides said laminate type of electrophotographic photosensitive member; for example, other types of photosensitive members can be prepared by incorporating the hydrazone compound together with a charge-generating substance in a layer, combining a charge-generating material with a charge-transfer complex formed from the hydrazone compound and an electron attracting compound, or forming a photosensitive layer by dispersing a charge-generating material in a matrix which has been formed by admixing the hydrazone compound and 2,4,7-trinitro-9-fluorenone into poly(n-vinylcarbazole).

The electrophotographic photosensitive members of this invention can be used not only in electrophotographic copying machines, but also in wide fields of other electrophotographic applications, such as those of laser printers, CRT printers, and electrophotographic printing plate making systems.

The electrophotographic photosensitive members according to this invention are markedly sensitive as compared with conventional ones, and in addition cause neither an increase in light portion potential nor a decrease in dark portion potential during 10,000 times or more repetition of charging and exposing. They also exhibit practically no sensitivity change due to humidity variations, being excellent in environmental stability.

This invention will be illustrated in reference to the following examples:

EXAMPLES 1-19

A solution of casein in aqueous ammonia (casein 11.2 g, 28% aqueous ammonia 1 g, water 222 ml) was coated on aluminum plates by means of a Meyer bar and dried to form a bond layer of 1.0 g/m² on each plate.

Then, a dispersion of 5 g of a disazo pigment having the structure

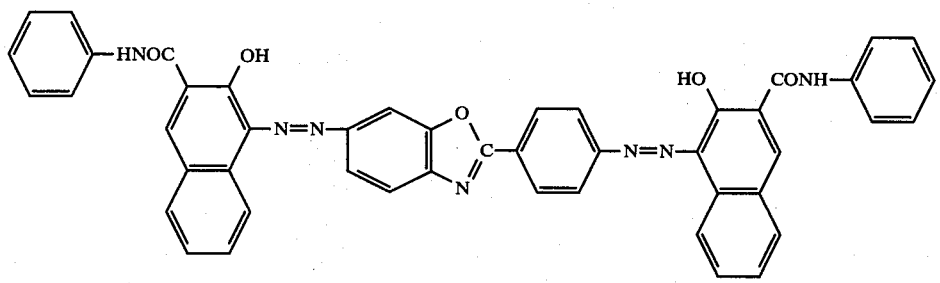

in a solution of 2 g of vinyl butyral resin (degree of butyral conversion: 63 mol%) in 95 ml of ethanol was coated on each bond layer to form a charge generation layer of 0.2 g/m² after drying.

Then, a solution prepared by dissolving 5 g of each of hydrazone compounds Nos. (1)-(19), cited above, and 5 g of poly(4,4'-dihydroxydiphenyl-2,2-propane carbonate) (viscosity-average mol.wt.: about 30,000; hereinafter, referred to simply as polycarbonate) in 150 ml of dichloromethane was coated on each charge generation layer and dried to form a charge transport layer of 10 g/m².

The electrophotographic photosensitive members (samples 1-19) thus prepared were tested for charge bearing characteristics by corona charging at ⊖5 KV in the static process using an electrostatic copying paper testing machine (Model SP-428, mfd. by Kawaguchi Denki K.K.), and exposing to light having an intensity of 5 lux after 10-second standing in a dark place.

The results are shown in Table 1-A, wherein Vo is original potential (V), Rv is potential retension (%) after 10-second standing in the dark, and E ½ is exposure quantity for having original potential.

COMPARATIVE EXAMPLES 1-3

Electrophotographic photosensitive members (comparative samples 1-3) were prepared in the same manner as Examples 1-19, except that the following known hydrazone compounds in place of the hydrazone compounds of this invention:

Compound used in comparative sample 1

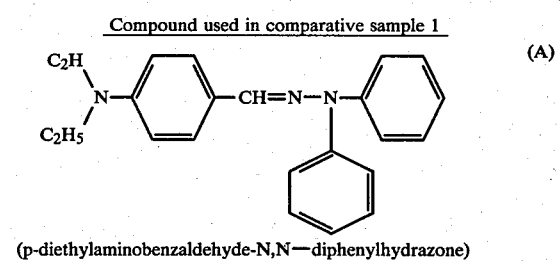

(p-diethylaminobenzaldehyde-N,N—diphenylhydrazone)

-continued

Compound used in comparative sample 2

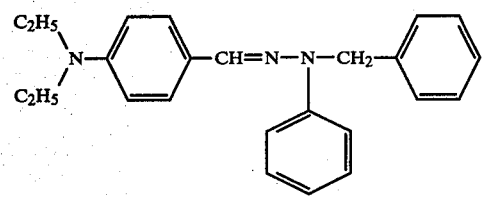
(B)

Compound used in comparative sample 3

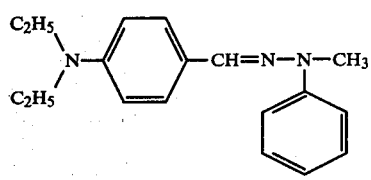
(C)

The charge bearing characteristics of comparative samples 1–3 measured in the same way as Examples 1–19 are shown in Table 1-B.

As is evident from Tables 1-A and 1-B, electrophotographic photosensitive members employing the specific hydrazone compounds of this invention are excellent in sensitivity as compared with those employing other known hydrazone compounds. Similar results to those of Comparative Examples 1–3 were also obtained when the following compounds, disclosed in U.S. Pat. No. 4150987 (Jpn. Pat. Appl. Laid-open No. 59143/1979), were used as hydrazone compounds not included in the scope of this invention: o-ethoxy-p-diethylaminobenzaldehyde-N,N-diphenylhydrazone, o-methyl-p-diethylaminobenzaldehyde-N,N-diphenylhydrazone, p-dibutylaminobenzaldehyde-N,N-diphenylhydrazone, and p-dimethylaminobenzaldehyde-N,N-diphenylhydrazone.

TABLE 1-A

| Sample No. | Hydrazone compound No. | Vo (−V) | Rv (%) | E ½ lux · sec |
|---|---|---|---|---|
| 1 | (1) | 530 | 94 | 4.1 |
| 2 | (2) | 520 | 93 | 4.2 |
| 3 | (3) | 540 | 92 | 4.1 |
| 4 | (4) | 510 | 94 | 4.3 |
| 5 | (5) | 520 | 93 | 4.2 |
| 6 | (6) | 530 | 91 | 4.6 |
| 7 | (7) | 500 | 92 | 4.2 |
| 8 | (8) | 510 | 93 | 5.2 |
| 9 | (9) | 530 | 90 | 5.4 |
| 10 | (10) | 530 | 90 | 4.4 |
| 11 | (11) | 540 | 93 | 4.2 |
| 12 | (12) | 510 | 92 | 4.6 |
| 13 | (13) | 540 | 93 | 4.2 |
| 14 | (14) | 540 | 91 | 4.5 |
| 15 | (15) | 510 | 90 | 4.6 |
| 16 | (16) | 520 | 93 | 5.3 |
| 17 | (17) | 530 | 92 | 4.2 |
| 18 | (18) | 540 | 93 | 4.7 |
| 19 | (19) | 500 | 90 | 4.3 |

TABLE 1-B

| Comparative sample No. | Comparative hydrazone compound | Vo (−V) | Rv (%) | E ½ lux · sec |
|---|---|---|---|---|
| 1 | (A) | 510 | 90 | 7.0 |
| 2 | (B) | 500 | 91 | 8.8 |
| 3 | (C) | 520 | 92 | 8.6 |

EXAMPLE 20

The layers of the same compositions and thickness values as in Example 1 were formed on aluminum drums of 120 mm in diameter in place of the aluminum plate, to prepare a photosensitive layer of drum shape.

The photosensitive drum was set in a charge and exposure testing machine in which a negative-working corona charging unit and an exposure unit were disposed around the drum position, and was charged and exposed under such conditions as to give a dark portion potential (VD) of ⊖600 V and a light portion potential (VL) of 30 V, to determine the relation between VL and the number of drum revolutions. The results are shown in Curve 1 of FIG. 1. These results have proved that the photosensitive member of this example, its VL value being stable even after 10,000 revolutions of the drum, serves as an electrophotographic photosensitive member very useful in respect to the prevention of image background from the staining due to a rise in residual potential after operations of long duration.

Another unused photosensitive member of this example and a charge exposure testing machine provided with the unused photosensitive member were humidified under a relative humidity of 85% at 30° C. for 24 hours, and the VD and VL were measured under the same environmental conditions. The results are shown in Table 2.

COMPARATIVE EXAMPLE 4

Photosensitive members were prepared by forming the photosensitive layers of completely the same compositions and thickness values as in Comparative Example 1, on aluminum drums of 120 mm in diameter.

Then, the relation between VL and the number of drum revolutions was determined on the photosensitive member in the same way as Example 20. The results are shown in Curve 2 of FIG. 1.

Curves 1 and 2 of FIG. 1 have demonstrated that the photosensitive member of this comparative example, exhibiting a markedly increased VL after 10,000 revolutions of the drum, is inferior to the photosensitive member of Example 20 in the stability of VL after operations of long duration.

Another unused photosensitive member of this comparative example was tested for VD and VL under the same environmental conditions as Example 20. The results are shown in Table 2.

TABLE 2

| Example | Conditions | VD (−V) | VL (−V) |
|---|---|---|---|
| Example 20 | Before humidification | 600 | 30 |
|  | After humidification | 590 | 35 |
| Comparative Example 4 | Before humidification | 600 | 30 |
|  | After humidification | 530 | 60 |

As is evident from Table 2, the photosensitive drums of Example 20 are superior to those of Comparative Example 4 in stabilities of VD and VL to high humidity conditions.

EXAMPLE 21

A dispersion of 1.0 g of β-form copper phthalocyanine in a solution prepared by dissolving 5 g of hydrazone compound No. 2, cited above, and 5 g of a copolyester of bisphenol A and a terephthalic acid-isophthalic acid mixture (molar ratio of terephthalic acid to isophthalic acid=1:1) in 150 ml of dichloromethane was coated on the casein layer formed in Example 1 on aluminum plate, to form a photosensitive layer of 10 g/m² after drying.

Charge bearing characteristics of the photosensitive member thus prepared were measured in the same way as Example 1, but by positive charging. The results were as follows:

TABLE 3

| | |
|---|---|
| Vo | ⊕ 500 V |
| Rv | 89% |
| E½ | 16.1 lux · sec |

COMPARATIVE EXAMPLE 5

A photosensitive member was prepared and tested for charge bearing characteristics in the same manner as Example 21 except that the same hydrazone compound as in comparative sample 1 was used in place of hydrazone compound No. 2. The results were as follows:

TABLE 4

| | |
|---|---|
| Vo | ⊕ 490 V |
| Rv | 88% |
| E½ | 24.0 lux · sec |

The photosensitive member of Example 21 has better sensitivity than that of Comparative Example 5, employing a known hydrazone compound.

EXAMPLE 22

A charge generation layer of 0.15μ in thickness was formed on an aluminum plate of 100μ in thickness by vacuum deposition of the following pigment:

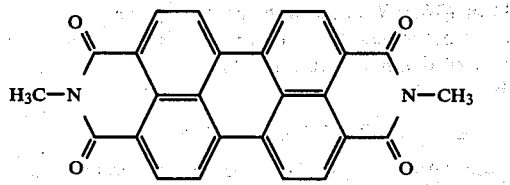

Then, a solution prepared by dissolving 5 g of a polyester resin (Vylon 200, mfd. by Toyobo Co., Ltd.) and 5 g of hydrazone compound No. 1, cited above, in 150 ml of dichloromethane was coated on the charge generation layer and dried to form a charge transport layer of 11 g/m².

The electrophotographic photosensitive member thus prepared was tested for charge bearing characteristics in the same way as Example 1. The results were as follows:

TABLE 5

| | |
|---|---|
| Vo | ⊖ 550 V |
| Rv | 93% |
| E½ | 5.6 lux · sec |

EXAMPLE 23

A charge generation layer of 0.8μ in thickness was formed on an aluminum plate by vacuum deposition of selenium-tellurium (tellurium 10 wt.%).

Then, the same charge-transporting material as used in Example 1 was coated on the charge generation layer and dried to form a charge transport layer of 11 g/m².

The photosensitive member thus prepared was tested for charge bearing characteristics in the same way as Example 1. The results were as follows:

TABLE 6

| | |
|---|---|
| Vo | ⊖ 540 V |
| Rv | 93% |
| E½ | 3.8 lux · sec |

EXAMPLE 24

A molybdenum plate (substrate), surface cleaned, of 0.2 mm in thickness was fixed to the definite position in a glow discharge vacuum deposition chamber. The chamber was evacuated to about $5 \times 10^{-6}$ torr. Then, the input voltage of a heater was raised and the temperature of the molybdenum substrate was settled on 150° C. Hydrogen gas and silane gas (15 vol% of hydrogen gas) were introduced into the chamber and the pressure in the chamber was settled on 0.5 torr by control of the gas flow and a main valve of the chamber. High-frequency power of 5 MHz was applied to an induction coil to generate a glow discharge in an inner space of the chamber surrounded the coil, to set the input power to 30 W. While keeping these conditions, amorphous silicon film was grown to 2μ in thickness and thereafter the glow discharge was stopped. The heater and the high-frequency power source were turned off, and after the substrate temperature had come to 100° C., out-flow valves for hydrogen gas and for silane gas were turned off to evacuate the chamber once to $10^{-5}$ torr or less. Then, the chamber pressure was returned to normal and the substrate was withdrawn. The same charge transport layer as Example 1 was then formed on the amorphous silicon layer in the same manner as Example 1.

The photosensitive member thus prepared was set in a charge and exposure testing machine, corona-charged at ⊖6 KV, and immediately thereafter exposed to a pattern of light which was projected from a tungsten lamp and passed through a transmission type of test chart.

Immediately thereafter, a positively chargeable developer (containing toner and carrier) was cascaded on the surface of the photosensitive member to obtain good toner images on the surface of the photosensitive member.

EXAMPLE 25

An aqueous solution of hydroxypropylcellulose was coated on an aluminum plate and dried to form a bond layer of 0.6 g/m².

A solution was prepared by dissolving 5 g of poly(N-vinylcarbazole) and 5 g of hydrazone compound No. 6, cited above, in 150 ml of dichloromethane, and 1.0 g of the same disazo pigment as used in Example 1 was dispersed in this solution. The resulting dispersion was coated on said bond layer and dried to form a photosensitive layer of 11 g/m².

Charge bearing characteristics of the photosensitive member thus prepared were measured in the same way as Example 1, but by positive charging. The results were as follows:

TABLE 7

| | |
|---|---|
| Vo | ⊕ 490 V |
| Rv | 88% |
| E½ | 15.6 lux · sec |

EXAMPLES 26–47

Photosensitive members (samples 26–47) were prepared and tested for charge bearing characteristics, in the same manner as Example 1, except that hydrazone compounds Nos. 22–43, listed in Table 8-A, were used respectively in place of hydrazone compound No. 1. The results are shown in Table 8-A.

COMPARATIVE EXAMPLES 6–8

Photosensitive members for comparison (comparative samples 6–8) were prepared and tested for charge bearing characteristics, in the same manner as Example 1, except that the following hydrazone compounds were used respectively in place of hydrazone compound No. 1:

Hydrazone compound used in comparative sample 6

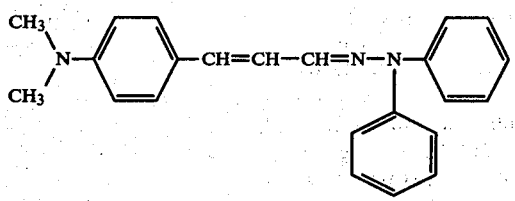

(D)

(p-dimethylaminocinnamaldehyde-N,N—diphenylhydrazone)

Hydrazone compound used in comparative sample 7

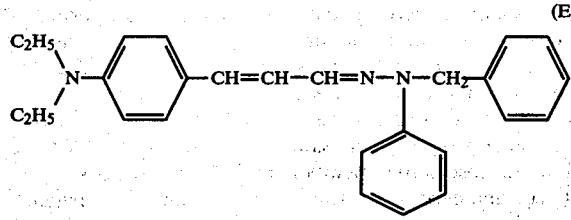

(E)

Hydrazone compound used in comparative sample 8

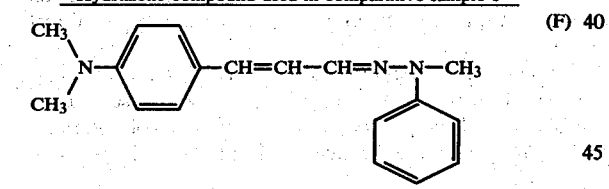

(F)

The results are shown in Table 8-B.

TABLE 8-A

| Sample No. | Hydrazone compound No. | Vo (−V) | Rv (%) | E½ (lux · sec) |
|---|---|---|---|---|
| 26 | (22) | 520 | 91 | 5.1 |
| 27 | (23) | 490 | 89 | 4.8 |
| 28 | (24) | 500 | 88 | 5.6 |
| 29 | (25) | 480 | 87 | 5.9 |
| 30 | (26) | 510 | 90 | 6.1 |
| 31 | (27) | 540 | 93 | 4.9 |
| 32 | (28) | 530 | 91 | 5.3 |
| 33 | (29) | 530 | 90 | 6.5 |
| 34 | (30) | 500 | 87 | 6.7 |
| 35 | (31) | 480 | 89 | 5.0 |
| 36 | (32) | 510 | 91 | 5.4 |
| 37 | (33) | 490 | 93 | 6.1 |
| 38 | (34) | 540 | 94 | 5.3 |
| 39 | (35) | 550 | 93 | 6.2 |
| 40 | (36) | 510 | 89 | 5.3 |
| 41 | (37) | 490 | 87 | 6.0 |
| 42 | (38) | 440 | 86 | 5.3 |
| 43 | (39) | 490 | 89 | 5.6 |
| 44 | (40) | 490 | 92 | 6.1 |

TABLE 8-A-continued

| Sample No. | Hydrazone compound No. | Vo (−V) | Rv (%) | E½ (lux · sec) |
|---|---|---|---|---|
| 45 | (41) | 520 | 91 | 5.4 |
| 46 | (42) | 480 | 89 | 5.0 |
| 47 | (43) | 470 | 87 | 5.3 |

TABLE 8-B

| Comparative sample No. | Comparative hydrazone compound | Vo (−V) | Rv (%) | E½ (lux · sec) |
|---|---|---|---|---|
| 6 | (D) | 500 | 88 | 12.1 |
| 7 | (E) | 520 | 91 | 18.0 |
| 8 | (F) | 480 | 86 | 18.9 |

As is evident from Tables 8A and 8B the electrophotographic photosensitive member employing the specific compounds according to the present invention are excellent in sensitivity as compared with those employing hydrazone compounds out of the scope of the present invention.

EXAMPLES 48–50

Photosensitive members (samples 48–50) were prepared by forming the photosensitive layers of the same compositions and thickness values as those of samples 37, 39, and 45 respectively, on aluminum drums of 120 mm in diameter.

Each photosensitive drum was set in a charge exposure testing machine in which a negative-working corona charging unit and an exposure unit were disposed around the drum position, and was charged and exposed under such conditions as to give a dark portion potential (VD) of ⊖600 V and a light portion potential (VL) of 30 V, to determine the relations of VD and VL to the number of drum revolutions. The results are shown in Table 9.

COMPARATIVE EXAMPLES 9–11

Comparative samples 9–11 were prepared by forming the photosensitive layers of the same compositions and thickness values as those of comparative samples 6–8, respectively, on aluminum drums similarly to Examples 48–50.

Then, the relations of VD and VL to the number of drum revolutions were determined on these comparative samples in the same way as Examples 48–50. The results are shown also in Table 9.

TABLE 9

| | Number of drum revolutions | | | | | | | |
|---|---|---|---|---|---|---|---|---|
| | 1 | | 54 | | 10,000 | | 15,000 | |
| | VD | VL | VD | VL | VD | VL | VD | VL |
| Sample No. | | | | | | | | |
| 48 | 600 | 30 | 580 | 35 | 590 | 40 | 570 | 40 |
| 49 | 600 | 30 | 590 | 40 | 610 | 35 | 580 | 45 |
| 50 | 600 | 30 | 610 | 40 | 580 | 40 | 565 | 50 |
| Comparative Sample No. | | | | | | | | |
| 9 | 600 | 30 | 620 | 80 | 610 | 120 | 580 | 140 |
| 10 | 600 | 30 | 590 | 70 | 560 | 110 | 540 | 130 |
| 11 | 600 | 30 | 550 | 40 | 510 | 60 | 470 | 90 |

Unit: −V

These results have proved that the photosensitive members of Examples 48–50, their VL values being stable even after 15,000 revolutions of drum, serve as an electrophotographic photosensitive member very useful in respect to the prevention of image background from the staining due to a rise in residual potential after operations of long duration.

On the other hand, comparative samples 9-11, exhibiting a marked decrease in VD and a marked increase in VL with increasing number of drum revolutions, are inferior in stabilities of VD and VL after operations of long duration, that is, the photosensitive members of this invention are much superior in these characteristics.

EXAMPLE 51

A dispersion of 1.0 g of β-form copper phthalocyanine in a solution prepared by dissolving 5 g of hydrazone compound No. 22, cited above, and 5 g of a copolyester of bisphenol A and a terephthalic acid-isophthalic acid mixture (molar ratio of terephthalic acid to isophthalic acid = 1:1) in 150 ml of dichloromethane was coated on the casein layer formed on Example 1 on an aluminum plate, to form a photosensitive layer of 10 g/m² after drying.

Charge bearing characteristics of the photosensitive member thus prepared were measured in the same way as Example 1 but by positive charging. The results were as follows:

TABLE 10

| | |
|---|---|
| Vo | ⊕ 480 V |
| Rv | 88% |
| E½ | 12.0 lux · sec |

COMPARATIVE EXAMPLE 12

A photosensitive member was prepared and tested for charge bearing characteristics in the same manner as Example 51, except that the same hydrazone compound (D) as in Comparative Example 6 was used in place of hydrazone compound No. 22. The results were as follows:

TABLE 11

| | |
|---|---|
| Vo | ⊕ 460 V |
| Rv | 89% |
| E½ | 22.3 lux · sec |

Table 11 shows that the photosensitive member according to Example 51 has excellent sensitivity as compared with Comparative Example 10 employing a hydrazone compound out of the scope of the present invention.

EXAMPLE 52

A photosensitive member was prepared and tested for charge bearing characteristics in the same manner as Example 22, except that hydrazone compound No. 23, cited above, was used in place of hydrazone compound No. 1. The results were as follows:

TABLE 12

| | |
|---|---|
| Vo | ⊖ 530 V |
| Rv | 92% |
| E½ | 5.3 lux · sec |

EXAMPLE 53

A charge generation layer of 0.8μ in thickness was formed on an aluminum plate by vacuum deposition of selenium-tellurium (tellurium 10 wt%).

The same charge-transporting material as used in sample 26 was coated on the charge generation layer and dried to form a charge transport layer of 11 g/m².

The photosensitive member thus prepared was tested for charge bearing characteristics in the same way as Example 1. The results were as follows:

TABLE 13

| | |
|---|---|
| Vo | ⊖ 550 V |
| Rv | 94% |
| E½ | 3.6 lux · sec |

EXAMPLE 54

The same charge transport layer as in sample 26 was formed on the same amorphous silicon layer as prepared in Example 24.

The photosensitive member thus prepared was set in a charge and exposure testing machine, corona-charged at ⊖6 KV, and immediately thereafter exposed to a pattern of light which was projected from a tungsten lamp and passed through a transmission type of test chart. Immediately thereafter, a positively chargeable developer (containing toner and carrier) was cascaded on the surface of the photosensitive member to obtain good toner images on the surface of the photosensitive member.

EXAMPLE 55

A photosensitive member was prepared and tested for charge bearing characteristics in the same manner as Example 25, except that hydrazone compound No. 27, cited above, was used in place of hydrazone compound No. 6. The results were as follows:

TABLE 14

| | |
|---|---|
| Vo | ⊕ 460 V |
| Rv | 88% |
| E½ | 14.1 lux · sec |

EXAMPLES 56-69

A solution of casein in aqueous ammonia (casein 11.2 g, 28% aqueous ammonia 1 g, water 222 ml) was coated on aluminum plates by means of a Meyer bar and dried to form a bond layer of 1.0 g/m² on each plate.

Then, a dispersion of 5 g of a disazo pigment having the structure

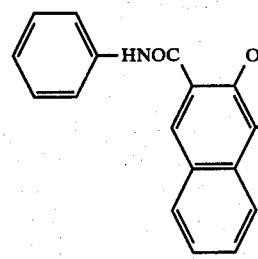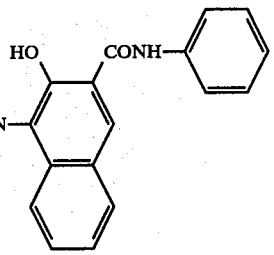

in a solution of 2 g of vinyl butyral resin (the same as used in Examples 1-19) in 95 ml of ethanol was coated on each bond layer to form a charge generation layer of 0.2 g/m² after drying.

Then, a solution prepared 5 g each of hydrazone compounds Nos. 44-57, cited above, and 5 g of polycarbonate (the same as used in Examples 1-19) in 150 ml of dichloromethane was coated on each charge generation layer and dried to form a charge transport layer of 10 g/m².

Charge bearing characteristics of the photosensitive members (samples 56-69) thus prepared were measured in the same way as Example 1. The results are shown in Table 15.

EXAMPLES 70-72

Photosensitive members of drum shape were prepared by forming the photosensitive layers of the same compositions and thickness values as those of Examples 56-58 on aluminum drums of 120 mm in diameter.

The relation between VL and the number of drum revolutions was determined on these photosensitive members in the same way as Example 20. The results are shown in Table 16.

TABLE 15

| Example No. | Hydrazone compound No. | Vo (−V) | Rv (%) | E½ (lux · sec) |
|---|---|---|---|---|
| 56 | (44) | 490 | 85 | 5.2 |
| 57 | (45) | 510 | 89 | 4.8 |
| 58 | (46) | 500 | 91 | 5.0 |
| 59 | (47) | 490 | 88 | 5.1 |
| 60 | (48) | 520 | 90 | 4.9 |
| 61 | (49) | 510 | 89 | 5.2 |
| 62 | (50) | 490 | 87 | 5.3 |
| 63 | (51) | 520 | 90 | 5.1 |
| 64 | (52) | 480 | 86 | 5.0 |
| 65 | (53) | 510 | 88 | 4.9 |
| 66 | (54) | 500 | 91 | 5.1 |
| 67 | (55) | 490 | 88 | 4.9 |
| 68 | (56) | 520 | 91 | 5.2 |
| 69 | (57) | 510 | 90 | 4.9 |

TABLE 16

| Example No. | VL at x-th revolution of drum | | |
|---|---|---|---|
| | x = 1 | x = 5000 | x = 10,000 |
| 70 (the same layers as Example 56) | 30 | 35 | 40 |
| 71 (the same layers as Example 57) | 30 | 30 | 40 |
| 72 (the same layers as Example 58) | 30 | 35 | 40 |

The results have proved that these photosensitive members, their VL values being stable even after 10,000 revolutions of drum, serve as an electrophotographic photosensitive member very useful in respect to the prevention of image background from the staining due to a rise in residual potential after operations of long duration.

EXAMPLE 73

A photosensitive member was prepared in the same manner as Example 51, except that hydrazone compound No. 45, cited above, was used in place of hydrazone compound No. 22.

Charge bearing characteristics of the photosensitive member were measured in the same way as Example 1, but by positive charging. The results were as follows:

TABLE 17

| Vo | ⊕ 500 V |
|---|---|
| Rv | 89% |
| E½ | 16.0 lux · sec |

EXAMPLE 74

A photosensitive member was prepared in the same manner as Example 22, except that hydrazone compound No. 46, cited above, was used in place of hydrazone compound No. 1.

Charge bearing characteristics of the photosensitive member were measured in the same way as Example 1. The results were as follows:

TABLE 18

| Vo | ⊖ 520 V |
|---|---|
| Rv | 92% |
| E½ | 5.6 lux · sec |

EXAMPLE 75

A photosensitive member was prepared in the same manner as Example 23, except that hydrazone compound No. 44, cited above, was used in place of hydrazone compound No. 1.

Charge bearing characteristics of the photosensitive member were measured in the same manner as Example 1. The results were as follows:

TABLE 19

| Vo | ⊖ 530 V |
|---|---|
| Rv | 91% |
| E½ | 4.1 lux · sec |

EXAMPLE 76

A photosensitive member was prepared by forming the same charge transport layer as in Example 56 on the same amorphous silicon layer as prepared in Example 24.

Good toner images were obtained by charging, exposing, and developing in the same way as Example 24.

EXAMPLE 77

A photosensitive member was prepared in the same manner as Example 25, except that hydrazone compound No. 48, cited above, was used in place of hydrazone compound No. 6.

Charge bearing characteristics of the photosensitive member were measured in the same way as Example 1, but by positive charging. The results were as follows:

TABLE 20

| Vo | ⊕ 480 V |
|---|---|
| Rv | 87% |
| E½ | 16.2 lux · sec |

What we claim is:

1. An electrophotographic photosensitive member characterized by having a charge transport layer or photosensitive layer which contains at least one hydrazone compound represented by the following formula (1) or (2):

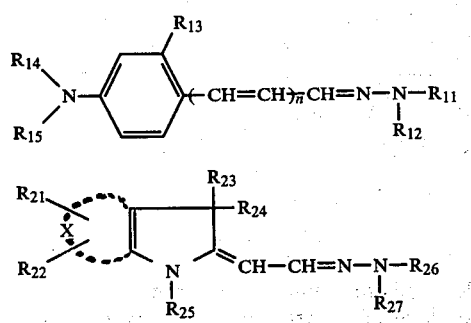

Formula (1)

Formula (2)

wherein $R_{11}$ represents substituted or unsubstituted naphthyl; $R_{12}$ represents substituted or unsubstituted alkyl, substituted or unsubstituted aralkyl, or substituted or unsubstituted aryl; $R_{13}$ represents hydrogen, alkyl, or alkoxy; $R_{14}$ and $R_{15}$ each represent substituted or unsubstituted alkyl, substituted or unsubstituted aralkyl, or substituted or unsubstituted aryl; n is 0 or 1; when n=1, $R_{14}$ and $R_{15}$, together with the nitrogen which links them, may complete a cyclic amino group; X represents a group necessary for completing a benzene ring or naphthalene ring; $R_{21}$ and $R_{22}$ each represent hydrogen, halogen, alkyl, alkoxy, or dialkylamino; and $R_{23}$, $R_{24}$, $R_{25}$, $R_{26}$ and $R_{27}$ each represent substituted or unsubstituted alkyl, substituted or unsubstituted aralkyl, or substituted or unsubstituted aryl.

2. An electrophotographic photosensitive member according to claim 1, wherein $R_{14}$ and $R_{15}$ each are alkyl.

3. An electrophotographic photosensitive member according to claim 2, wherein $R_{14}$ and $R_{15}$ each are a group selected from methyl, ethyl, propyl, and butyl.

4. An electrophotographic photosensitive member according to claim 3, wherein $R_{14}$ and $R_{15}$ are ethyl.

5. An electrophotographic photosensitive member according to claim 1, wherein $R_{11}$ is a group selected from α-naphthyl and β-naphthyl.

6. An electrophotographic photosensitive member according to claim 5, wherein $R_{12}$ is a group selected from methyl, ethyl, benzyl, phenyl, α-naphthyl, and β-naphthyl.

7. An electrophotographic photosensitive member according to claim 1, wherein $R_{13}$ is hydrogen.

8. An electrophotographic photosensitive member according to claim 1, wherein $R_{23}$ and $R_{24}$ each are alkyl.

9. An electrophotographic photosensitive member according to claim 8, wherein $R_{23}$ and $R_{24}$ each are a group selected from methyl, ethyl, propyl, and butyl.

10. An electrophotographic photosensitive member according to claim 9, wherein $R_{23}$ and $R_{24}$ are methyl.

11. An electrophotographic photosensitive member according to claim 8, wherein $R_{23}$, $R_{24}$ and $R_{25}$ each are alkyl.

12. An electrophotographic photosensitive member according to claim 11, wherein $R_{23}$, $R_{24}$ and $R_{25}$ each are a group selected from methyl, ethyl, propyl and butyl.

13. An electrophotographic photosensitive member according to claim 12, wherein $R_{23}$, $R_{24}$ and $R_{25}$ are methyl.

14. An electrophotographic photosensitive member according to claim 1, wherein $R_{26}$ is a group selected from phenyl, α-naphthyl and β-naphthyl.

15. An electrophotographic photosensitive member according to claim 14, wherein $R_{26}$ and $R_{27}$ each are a group selected from phenyl, α-naphthyl and β-naphthyl.

16. An electrophotographic photosensitive member according to claim 14, wherein $R_{27}$ is a group selected from methyl and ethyl.

17. An electrophotographic photosensitive member according to claim 1, wherein $R_{21}$ and $R_{22}$ are hydrogen.

18. An electrophotographic photosensitive member according to claim 1, wherein comprises a charge transport layer containing said hydrazone compound and a charge generation layer.

19. An electrophotographic photosensitive member according to claim 18, wherein said charge transport layer is laid on said charge generation layer.

20. An electrophotographic photosensitive member according to claim 19, wherein a bond layer is laid between said charge generation layer and a conductive layer.

21. An electrophotographic photosensitive member according to claim 18, wherein said charge generation layer contains a charge-generating material selected from selenium, selenium-tellurium, selenium-arsenic, cadmium sulfide, amorphous silicon, pyrylium dyes, thiopyrylium dyes, triarylmethane dyes, thiazine dyes, cyanine dyes, phthalocyanine pigments, perylene pigments, indigo pigments, thioindigo pigments, quinacridone pigments, methine dyes derived from squaric acid, azo pigments, and polycyclic quinone pigments.

22. An electrophotographic photosensitive member according to claim 21, wherein said charge generation layer comprises a vacuum deposition layer of selemium-tellurium.

23. An electrophotographic photosensitive member according to claim 21, wherein said charge generation layer comprises a vacuum deposition layer of a perylene pigment.

24. An electrophotographic photosensitive member according to claim 21, wherein said charge generation layer comprises an amorphous silicon layer formed by a glow discharge.

25. An electrophotographic photosensitive member according to claim 21, wherein said charge generation layer comprises at least a binder and a charge-generating material selected from azo pigments phtalocyanine pigmetns, perylene pigments, indigo pigments, thioindigo pigments, quinacridione pigments, methine dyes derived from squaric acid and polycyclic quinone pigments.

26. An electrophotographic photosensitive member according to claim 25, wherein said charge generation layer comprises at least a disazo pigment and a binder.

27. An electrophotographic photosensitive member according to claim 26, wherein said disazo pigment has the following formula 28. An electrophotographic photosensitive member according to claim 26, wherein said disazo pigment has the following formula 29. An electrophotographic photosensitive member according to claim 26, wherein said disazo pigment has the following formula

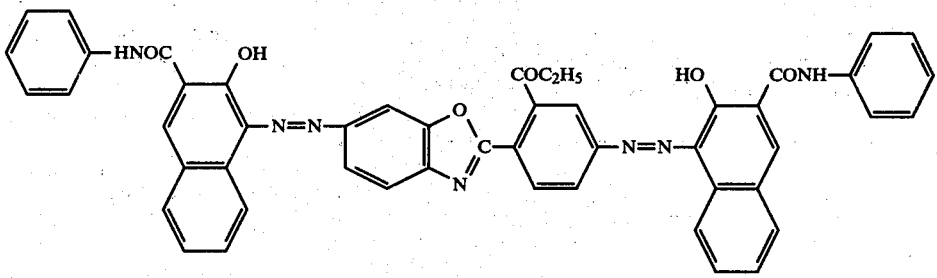

30. An electrophotographic photosensitive member according to claim 26, wherein said disazo pigment has the following formula

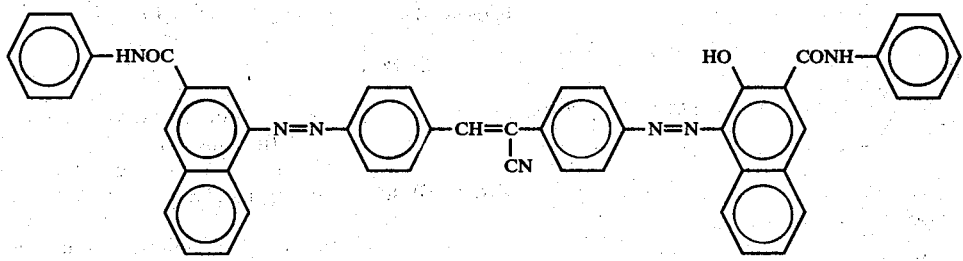

31. An electrophotographic photosensitive member according to claim 25, wherein said perylene pigment has the following formula

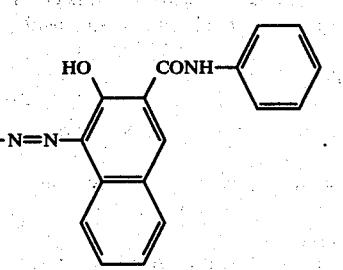

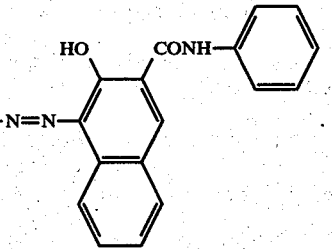

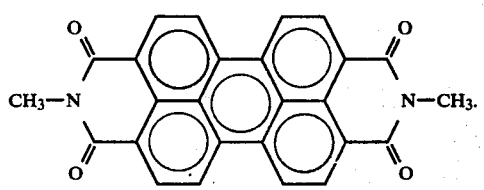

32. An electrophotographic photosensitive member according to claim 25, wherein said perylene pigment has the following formula

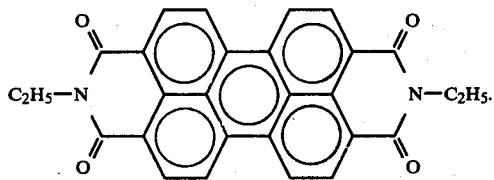

33. An electrophotographic photosensitive member according to claim 26, wherein said binder is a high-molecular materials selected from poly(vinyl butyral) and polyesters.

34. An electrophotographic photosensitive member according to claim 33, wherein said binder is poly(vinyl butyral).

35. An electrophotographic photosensitive member according to claim 18, wherein said charge transport layer comprises at least said hydrazone compound and a binder.

36. An electrophotographic photosensitive member according to claim 35, wherein said binder is a high-molecular material selected from acrylic resins, polyester resins and polycarbonate resins.

37. An electrophotographic photosensitive member according to claim 20, wherein said bond layer contains casein or hydroxypropyl-cellulose.

38. An electrophotographic photosensitive member according to claim 1, which has a photosensitive layer comprising at least said hydrazone compound, a charge-generating material and a binder.

39. An electrophotographic photosensitive member according to claim 1, which has a photosensitive layer comprising at least said hydrazone compound, an electron attracting material, a charge generating material and a photoconductive polymer.

* * * * *

UNITED STATES PATENT AND TRADEMARK OFFICE
CERTIFICATE OF CORRECTION

PATENT NO. : 4,423,129          Page 1 of 2
DATED      : December 27, 1983
INVENTOR(S): Takasu, et al.

It is certified that error appears in the above-identified patent and that said Letters Patent is hereby corrected as shown below:

Title page, [54], the title of the Invention, "HYRAZONE" should be --HYDRAZONE--.
Col. 1, line 31, "member" should be --members--.
Col. 4, line 37, diagram 7,

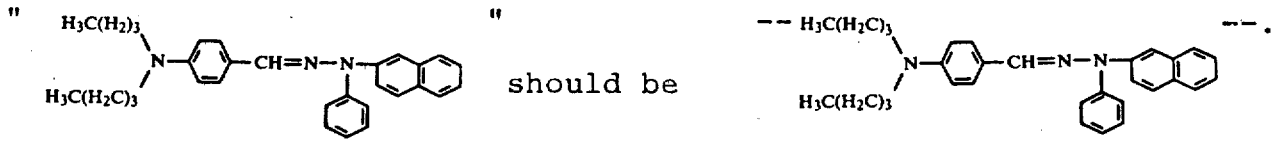

Col. 9, line 26, "compound" should be --compounds--.

Col. 20, diagram 27,

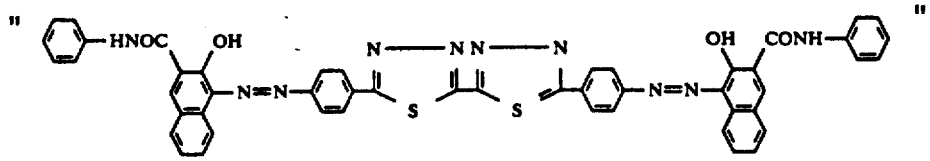

should be

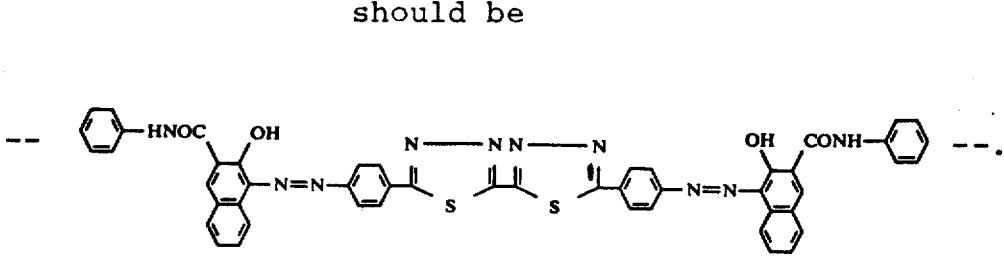

UNITED STATES PATENT AND TRADEMARK OFFICE
CERTIFICATE OF CORRECTION

PATENT NO. : 4,423,129  
DATED : December 27, 1983  
INVENTOR(S) : Takasu, et al.

Page 2 of 2

It is certified that error appears in the above-identified patent and that said Letters Patent is hereby corrected as shown below:

Col. 26, line 60,

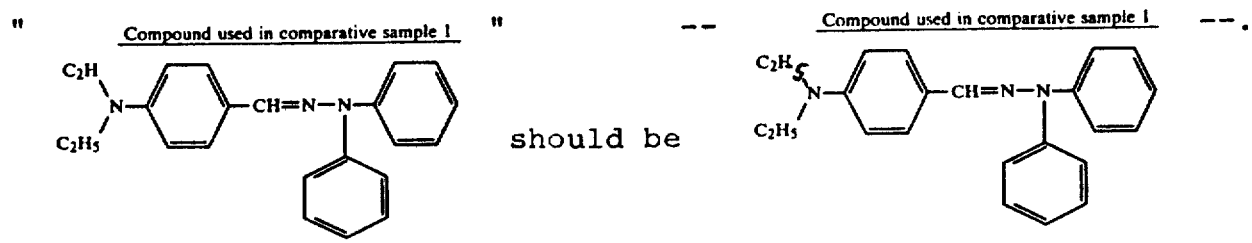

Col. 29, line 2, before "aluminum" insert --an--.  
Claim 3, Col. 37, line 56, "$R_{14l}$" should be --$R_{14}$--.

Claim 25, Col. 39, line 2, "quinacridione" should be --quinacridone--.

Signed and Sealed this

Seventh Day of August 1984

[SEAL]

Attest:

*Attesting Officer*

GERALD J. MOSSINGHOFF

*Commissioner of Patents and Trademarks*